United States Patent
Umeda et al.

(10) Patent No.: US 6,496,323 B1
(45) Date of Patent: Dec. 17, 2002

(54) INFORMATION RECORDING/ REPRODUCING APPARATUS AND METHOD

(75) Inventors: Yoshio Umeda, Kobe (JP); Hiroshi Kohso, Osaka (JP); Tatsuhiko Inagaki, Suita (JP); Toshiyuki Wada, Toyonaka (JP); Makoto Kuwamoto, Hirakata (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/381,443

(22) PCT Filed: Jan. 18, 1999

(86) PCT No.: PCT/JP99/00118
§ 371 (c)(1),
(2), (4) Date: Sep. 20, 1999

(87) PCT Pub. No.: WO99/36914
PCT Pub. Date: Jul. 22, 1999

(30) Foreign Application Priority Data

Jan. 19, 1998 (JP) ............................. 10-007271

(51) Int. Cl.[7] .............................................. G11B 5/596
(52) U.S. Cl. ................................................... 360/78.09
(58) Field of Search ................................ 360/75, 78.09, 360/78.07; 318/561, 610, 560, 615

(56) References Cited

U.S. PATENT DOCUMENTS 5,155,422 A * 10/1992 Sidman et al. .............. 318/560

(List continued on next page.)

FOREIGN PATENT DOCUMENTS

| JP | 63-316380 | 12/1988 |
| JP | 3-233608 | 10/1991 |
| JP | 4-61671 | 2/1992 |
| JP | 4-112205 | 4/1992 |
| JP | 5-109217 | 4/1993 |
| JP | 5-334817 | 12/1993 |
| JP | 6-52563 | 2/1994 |
| JP | 6-301948 | 10/1994 |
| JP | 10-199168 | 7/1998 |
| JP | 10-275433 | 10/1998 |

OTHER PUBLICATIONS

International Search Report corresponding to application No. PCT/JP99/00118 dated Apr. 27, 1999 (with English translation).

*Primary Examiner*—David Hudspeth
*Assistant Examiner*—K. Wong
(74) *Attorney, Agent, or Firm*—RatnerPrestia

(57) ABSTRACT

To improve the positioning accuracy which has been limited so far due to a vibration mode of an actuator for positioning a head and increase the capacity of an apparatus by raising the density of tracks for recording or reproducing information.

There are provided an information recording/reproducing medium, a head for recording or reproducing information while moving relatively to the information recording/reproducing medium, an actuator for supporting the head and movable in accordance with a command, and a control section for supplying a command to the actuator in accordance with a signal reproduced by the head to control the movement of the actuator, the actuator has at least one vibration mode in addition to a movement mode as a rigid body, and the control section is configured by an internal model including at least one vibration mode of the actuator and has a state estimating section for estimating quantities of states of the vibration mode and rigid-body mode of the actuator in accordance with a controlled variable corresponding to a movement command to the actuator and a controlled-variable generating section for generating a controlled variable in accordance with each estimated quantity of state estimated by the state estimating section.

30 Claims, 18 Drawing Sheets

U.S. PATENT DOCUMENTS

| | | | |
|---|---|---|---|
| 5,229,896 A | * 7/1993 | Tohyama et al. | 360/78.07 |
| 5,325,247 A | * 6/1994 | Ehrlich et al. | 360/78.09 |
| 5,404,252 A | 4/1995 | Nagasawa et al. | |
| 5,426,545 A | * 6/1995 | Sidman et al. | 360/78.09 |
| 5,721,648 A | 2/1998 | Phan et al. | |
| 6,034,834 A | * 3/2000 | Yoshikawa et al. | 360/75 |
| 6,064,540 A | * 5/2000 | Huang et al. | 360/75 |

\* cited by examiner

INFORMATION RECORDING/REPRODUCING APPARATUS AND METHOD

This Application is a U.S. National Phase Application of PCT International Application PCT/JP99/00118.

TECHNICAL FIELD

The present invention relates to a recording/reproducing apparatus, and method for recording or reproducing information in or from a recordable and reproducible medium by a head, particularly to a disk drive for recording or reproducing information in or from a magnetic recording/reproducing layer or an optical recording/reproducing layer formed on the surface of a discoid substrate made of aluminum, glass, or plastic by a recording/reproducing head such as a magnetic head or an optical pickup.

BACKGROUND ART

Disk drives including optical disk drives and magnetic disk units have been frequently used as external memories because personal computers have been spread and advanced in recent years. Therefore, it is requested that these disk drives serving as external memories have a large capacity because computer software has been swollen and the capacity of data to be handled has been increased.

Moreover, a disk drive making the most use of high speed and large capacity is being used not only for computers but also for digital AV units for recording or reproducing images and sounds by employing digital techniques and therefore, a large-capacity disk drive is desired in order to record and reproduce digital AV information including a lot of data. Particularly, a request for increasing the capacity of a high-speed magnetic disk unit has been enhanced more and more because the disk drive is widely applied and positioned as a core.

A conventional magnetic disk unit will be described below.

FIG. 16 is a schematic illustration showing the conventional magnetic disk unit. In FIG. 16, symbol 1 denotes a magnetic disk, 2 denotes a magnetic head for recording or reproducing information in or from the magnetic disk 1, 3 denotes an actuator for having the magnetic head 2 at its front end to perform positioning at an optional radius position of the magnetic disk 1, 5 denotes a head amplifier for detecting and amplifying a reproduced signal of the magnetic head 2, 4 denotes a controller for outputting a control signal for detecting a relative position of the magnetic head 2 to the magnetic disk 1 in accordance with an output of the head amplifier 5 and setting the actuator 3 to a predetermined position on the magnetic disk 1, and 6 denotes a driver for supplying the current corresponding to the control signal to the actuator 3. Moreover, though not illustrated, the following are provided: a spindle motor for rotating the magnetic disk 1, an interface section for transferring digital information to and from a host computer, a buffer and its control section for storing the digital information and efficiently recording or reproducing the information in or from the magnetic disk 1, and a information recording/reproducing circuit.

Then, operations of the conventional magnetic disk unit will be described below. When the magnetic disk 1 records and reproduces information, it is rotated by a not-illustrated spindle motor at a constant speed. In this case, the magnetic head 2 is positioned onto the magnetic disk 1 and held by the actuator 3 while levitated at a position where the pressure of a suspension 3b provided for the front end of the actuator 3 and the working force of the air flow between a slider integrated with a not-illustrated magnetic head 2 and the magnetic disk 1 are balanced. Positional information for detecting the deviation from each of concentric tracks (one track is shown as symbol a by a broken line in FIG. 16), that is, servo information (shown by symbol b in FIG. 16) is previously recorded on each track of the magnetic disk 1. The servo information b is recorded on tracks every certain interval and thereby, the magnetic head 2 reproduces the servo information every certain time in accordance with the rotation of the magnetic disk 1. A region in which the servo information is recorded is referred to as servo region. Thus, information is recorded or reproduced in or from regions other than the servo region and the regions are referred to as data regions.

A reproduced signal of the magnetic head 2 is detected and amplified by the head amplifier 5 and thereby inputted to the controller 4. The controller 4 discriminates servo information in accordance with the inputted signal, computes a positional error to the target track a of the magnetic head 2, moreover computes a controlled variable necessary for driving the actuator 3 so as to reduce the positional error, and outputs a control signal. In this case, a control system for phase compensation or the like is used. The driver 6 supplies a necessary current to a driving coil 3c of the actuator 3 in accordance with an inputted control signal. Thereby a driving force is generated by the driving coil 3c and a permanent magnet 3d set so as to face the coil 3c and the actuator rotates centering around a point c to always position the magnetic head 2 on the target track a. Under the above state, information is recorded or reproduced in or from the data region by the magnetic head 2. Therefore, a positioning control system of a closed loop for positioning a magnetic head on a target track is adopted to record or reproduce information.

However, the above configuration causes the following problems.

That is, to increase the capacity of a magnetic disk unit, it is necessary to increase the information volume which can be recorded in one track, that is, to improve the track recording density or to form tracks in one magnetic disk as many as possible, that is, to improve the track density. In this case, when the track density is improved, in other words, when the distance between adjacent tracks (that is, decreasing the track pitch) is decreased, it is impossible to correctly record or reproduce information unless pieces of the information in adjacent tracks are prevented from interfering each other when recording or reproducing the information. Therefore, it is necessary to improve the positioning accuracy of the target track of a magnetic head and to expand the control bandwidthwidth of the positioning control system.

In case of the conventional method, expansion of a control bandwidthwidth, that is, expansion of the cutoff frequency of an open-loop transfer function is restricted due to the vibration mode resonant frequency of bend or twist of the arm section 3a, suspension 3b, or driving coil 3c of an actuator. FIG. 17(a) shows the frequency-response characteristic of the actuator and FIG. 17(b) shows an open-loop transfer function when applying phase compensation to the controller 4. As shown in FIG. 17(b), because a phase delay occurs due to resonance nearby 2 kHz of the actuator, a control bandwidthwidth is up to 400 Hz. Actually, it was possible to increase the control bandwidthwidth only up to ⅕ to ⅕ with respect to the resonant frequency of the vibration mode of the actuator because the control bandwidthwidth must be set to a value lower than 400 Hz by considering dispersion and fluctuation. Therefore, improvement of the positioning accuracy of a magnetic head was limited and resultantly, it was difficult to increase the capacity of a disk drive.

SUMMARY OF THE INVENTION

The present invention is made to solve the above problems and its object is to provide an information recording/reproducing apparatus, and method including a magnetic desk unit, which makes it possible to increase the capacity of a disk drive by improving the positioning accuracy of a magnetic head.

An apparatus, and method of the present invention comprises an information recording/reproducing medium, a head for recording or reproducing information while moving relatively to the information recording/reproducing medium, an actuator for supporting the head and movable in accordance with a command, and a control section for controlling movement by supplying a command to the actuator in accordance with a signal reproduced by the head, in which the actuator has at least one vibration mode in addition to the movement mode as a rigid body, the control section is configured by an internal model including at least one vibration mode of the actuator, and a state estimating section for estimating the quantities of states of vibration mode and rigid-body mode of the actuator in accordance with a reproduced signal of the head and a controlled variable corresponding to a movement command to the actuator and a controlled-variable generating section for generating a controlled variable in accordance with each estimated quantity of state estimated by the state estimating section are included.

DESCRIPTION OF SYMBOLS

1 Magnetic disk
2 Magnetic head
3 Actuator
4 Controller
5 Head amplifier
6 Driver
7 Acceleration sensor

BEST MODE FOR CARRYING OUT THE INVENTION

Embodiments of the present invention will be described below by referring to the accompanying drawings.

Embodiment 1

Figure 1:
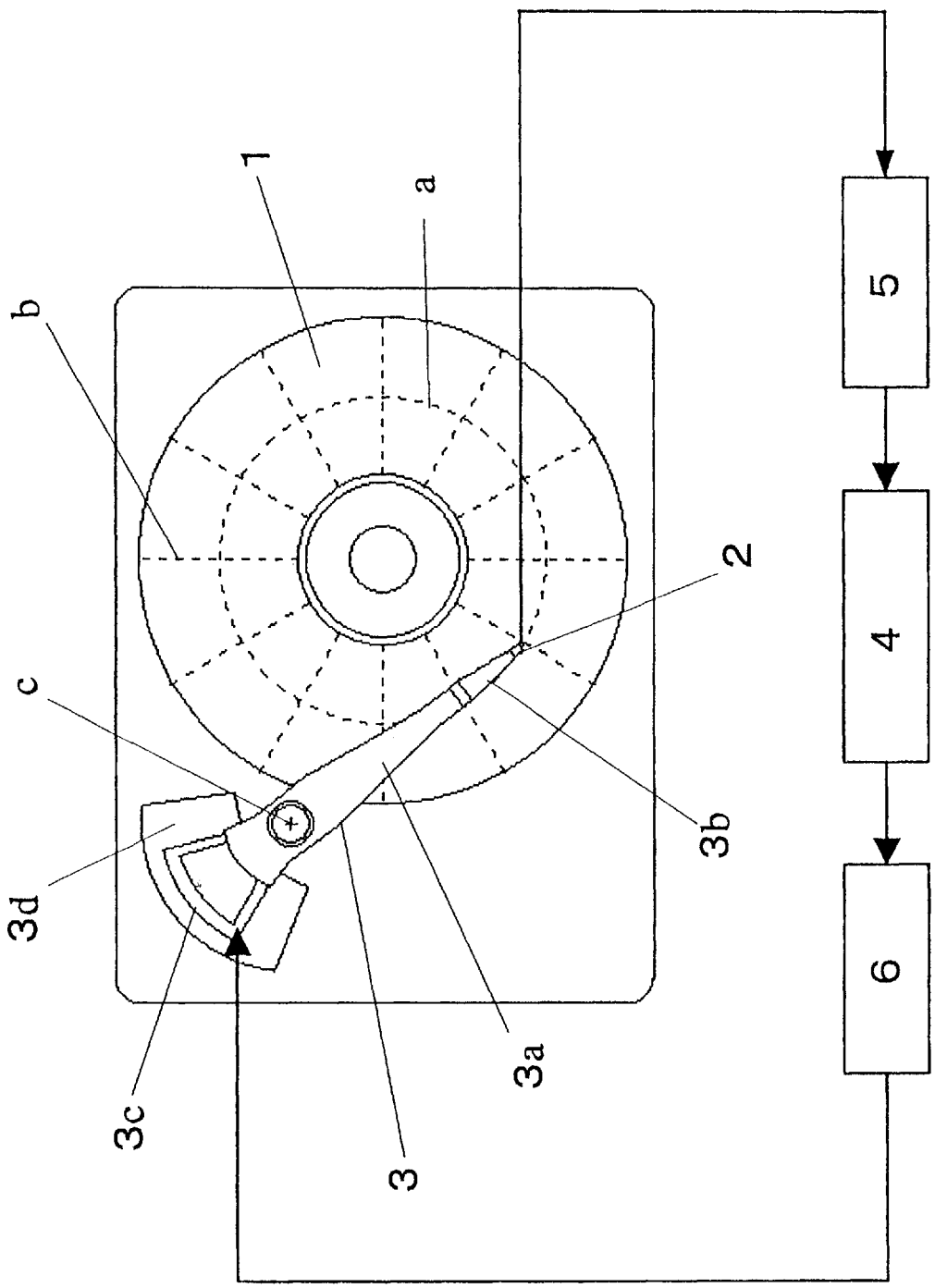
FIG. 1 shows a schematic block diagram of a magnetic disk unit of a first embodiment of the present invention.

FIG. 1 shows a schematic block diagram of a magnetic disk unit showing an embodiment of the present invention, in which symbol 1 denotes a magnetic disk, 2 denotes a magnetic head for recording or reproducing information in or from the magnetic disk 1, 3 denotes an actuator mounting the magnetic head 2 at its front end to perform positioning at an optional radius position of the magnetic disk 1, 5 denotes a head amplifier for detecting and amplifying a reproduced signal of the magnetic head 2, 4 denotes a controller for outputting a control signal for detecting the relative position of the magnetic head 2 to the magnetic disk 1 in accordance with an output of the head amplifier and setting the actuator 3 to a predetermined position on the magnetic disk 1, and 6 denotes a driver for supplying a current corresponding to the control signal to the actuator 3. Moreover, though not illustrated, the following are provided: a spindle motor for rotating the magnetic disk 1, an interface section for transferring digital information to and from a host computer, a buffer and its control section for storing the digital information and efficiently recording or reproducing the information in or from the magnetic disk 1, and an information recording/reproducing circuit.

Figure 16:
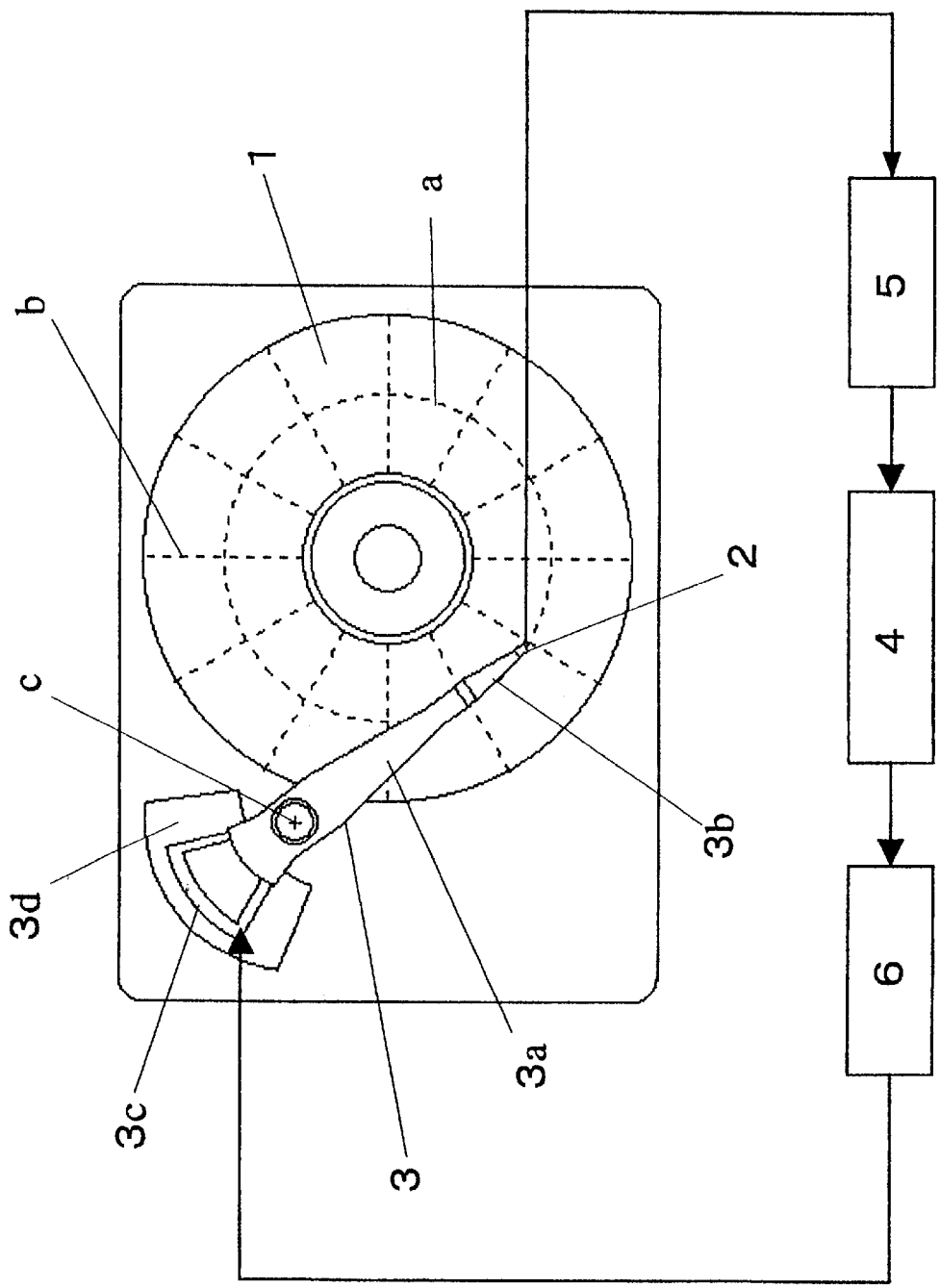
FIG. 16 shows a schematic block diagram of a conventional magnetic disk unit.
Figure 17A:
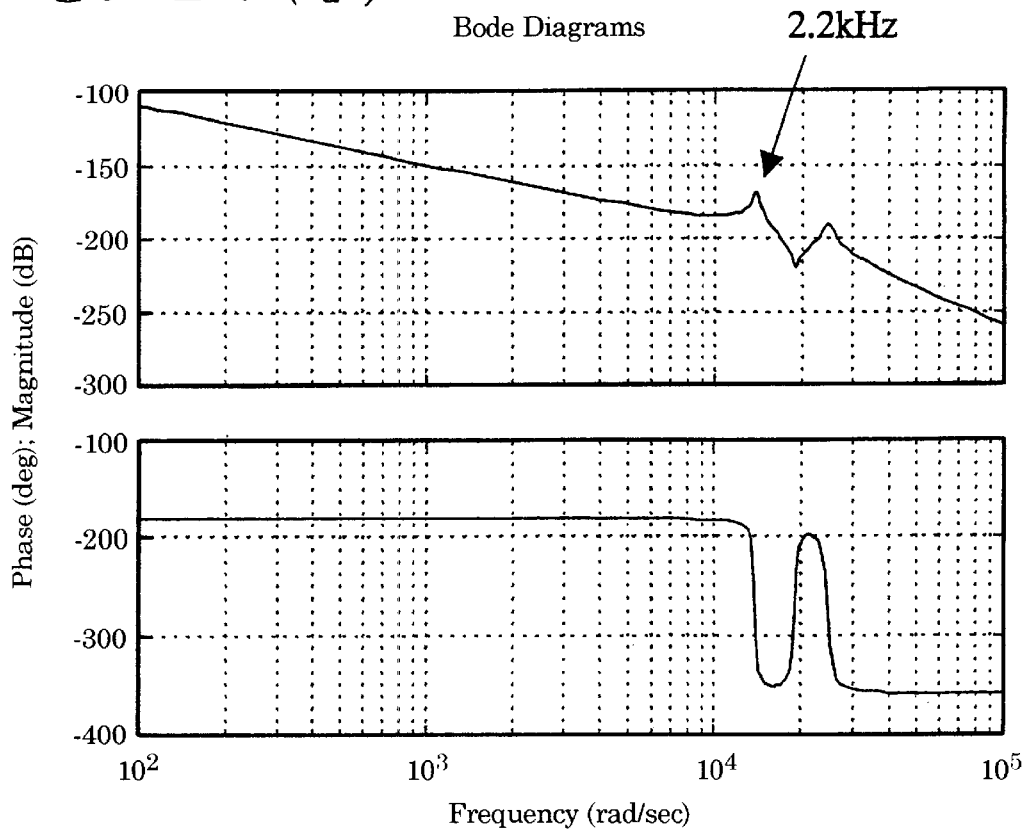
FIG. 17 shows frequency-response characteristic diagrams of the open-loop transfer characteristic of the conventional magnetic disk unit.
Figure 17B:
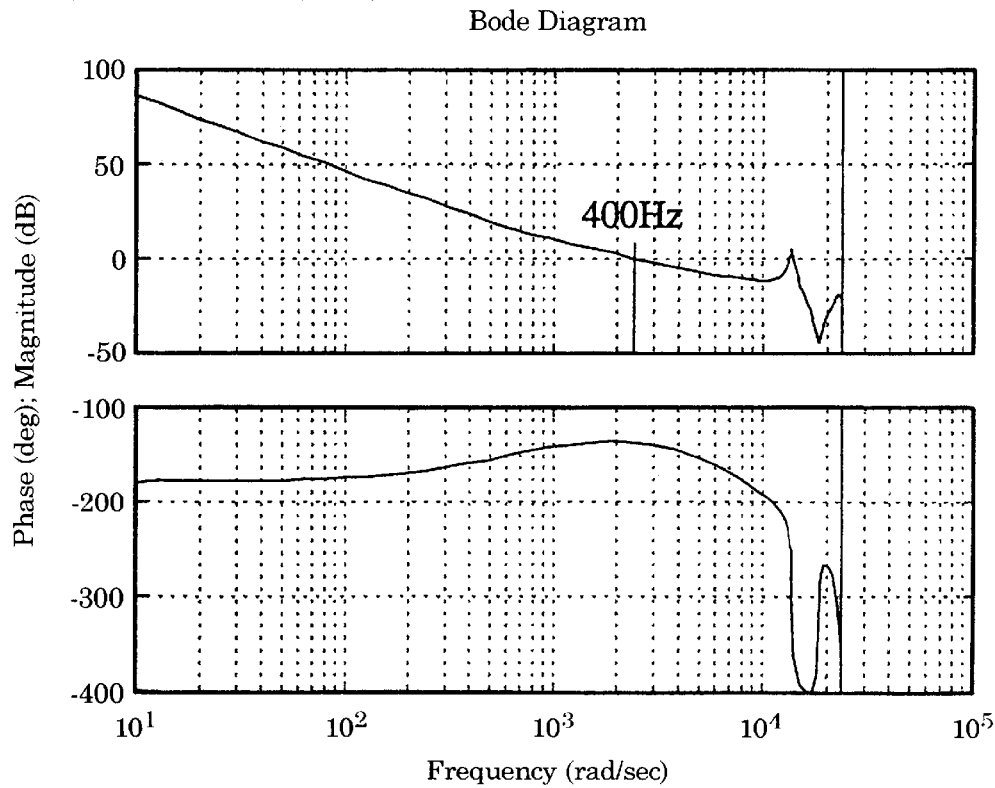

Operations of the magnetic disk unit will be described below. When the magnetic disk 1 records or reproduces information, the magnetic disk 1 is rotated by a not-illustrated spindle motor at a certain speed. In this case, the magnetic head 2 is positioned onto the magnetic disk 1 and held by the actuator 3 while levitated at a position where the pressure of a suspension 3b provided for the front end of the actuator 3 and the working force of the air flow between a slider integrated with a not-illustrated magnetic head and the magnetic disk 1 are balanced. Positional information for detecting the deviation from each of concentric tracks (one track is shown as symbol a by a broken line in FIG. 16), that is, servo information (shown by symbol b in FIG. 16) is previously recorded on each track of the magnetic disk 1. The servo information b is referred to as a servo signal and recorded on tracks every certain interval and thereby, the magnetic head 2 reproduces the servo information every certain time in accordance with the rotation of the magnetic disk 1. A region in which the servo signal is recorded is referred to as servo region. Thus, information is recorded or reproduced in or from regions other than the servo region and the regions are referred to as data regions.

A reproduced signal of the magnetic head 2 is detected and amplified by the head amplifier 5 and thereby inputted to the controller 4. The controller 4 discriminates that the signal is a servo signal in accordance with the inputted signal, computes a positional error to the target track a of the magnetic head 2, moreover computes a controlled variable necessary for driving the actuator 3 so as to reduce the positional error, and outputs a control signal. The driver 6 supplies a necessary current to the driving coil 3c of the actuator 3 in accordance with an inputted control signal. Thereby, a driving force is generated by the driving coil 3c and a permanent magnet 3d set so as to face the coil 3c, and the actuator rotates centering around a point c to always position the magnetic head 2 on the target track a. Under the above state, information is recorded or reproduced in or from the data region by the magnetic head 2. Therefore, a positioning control system of a closed loop for positioning a magnetic head on a target track is adopted to record or reproduce information.

Figure 2:
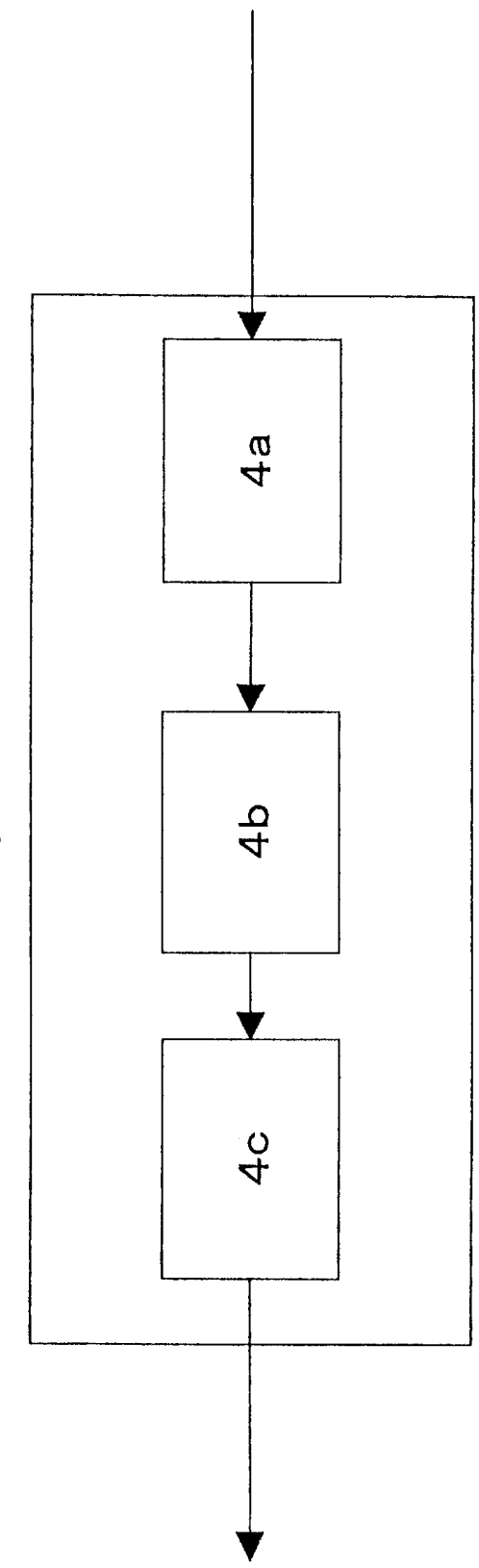
FIG. 2 shows an illustration for explaining the configuration of a controller of the first embodiment.

Then, the internal configuration of the controller 4 will be described below in detail. FIG. 2 shows the configuration of the controller 4. In FIG. 2, symbol 4a denotes a servo-signal detecting section for detecting a servo signal on the magnetic disk 1 and converting it into a digital signal. Symbol 4b denotes a controlled-variable computing section for computing a controlled variable for positioning the magnetic head 2 on a track in accordance with detected servo information, which is realized with a microcomputer and software in which an operation algorithm is described. Symbol 4c denotes a digital-analog converting section for converting a digitally-computed controlled variable into an analog control signal. Because a servo region is radially formed as shown in FIG. 1, servo information is detected at a constant frequency fs by the magnetic head 2 and the controlled-variable computing section 4b computes a controlled variable whenever a servo signal is detected, that is, every cycle Ts of the frequency fs. In case of this embodiment, the frequency fs is set to 7,520 Hz and the cycle Ts is set to 0.13 ms. The digital-analog converting section 4c holds a digitally-computed controlled variable and updates an analog output whenever the controlled variable is updated, that is, every time Ts.

Figure 3:
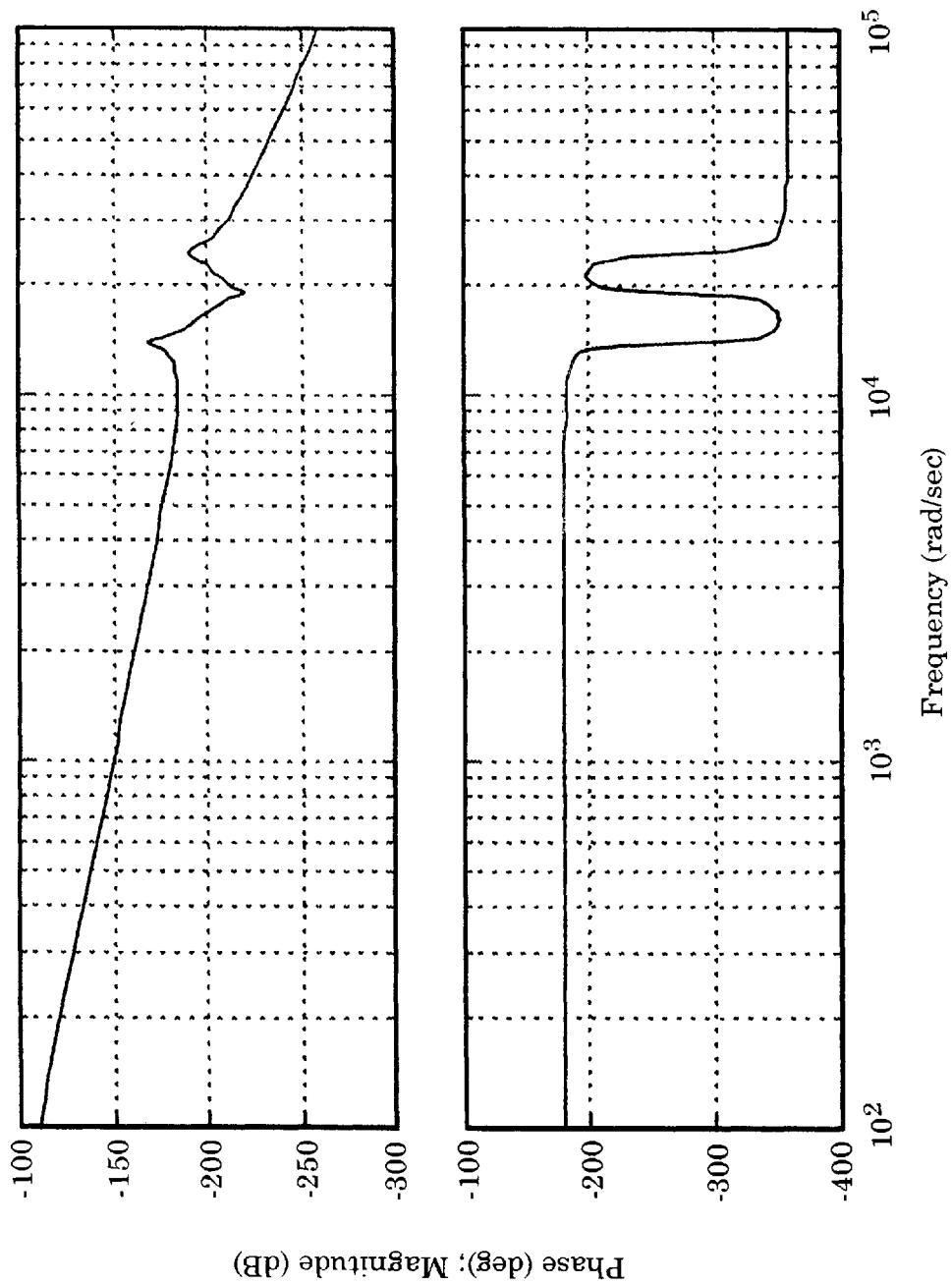
FIG. 3 shows frequency-response characteristic diagrams of an actuator of the first embodiment.

The operation algorithm of the controlled-variable computing section 4b will be s described below. FIG. 3 shows frequency-response characteristics of the actuator 3. As shown in FIG. 3, the actuator 3 has not only a mode as a rigid body but also a first vibration mode having resonance at a frequency close to 2.2 kHz and a second vibration mode having a resonance frequency of 3.9 kHz. When a controlled variable is computed by using a phase compensation filter serving as a conventional operation algorithm for the actuator 3, it is already described that a control bandwidthwidth can be expanded up to only 400 Hz due to the presence of the first vibration mode. Therefore, this embodiment considers up to the first vibration mode of the actuator 3, which is the largest factor for preventing expansion of a control bandwidthwidth. The state equation of the actuator 3 in the above case is shown by the following (Equation 1) by assuming a state variable as xn and an input current as u.

$$x_n = (y \; \theta \; q_1 \; \dot{q}_1)^t \quad \text{(Equation 1)}$$

$$\dot{x}_n = A_{pn} x_n + b_{pn} u$$

$$y = c_{pn} x_n$$

$$A_{pn} = \begin{pmatrix} 0 & ky & 0 & 0 \\ 0 & 0 & kvb_{11} & kvb_{12} \\ 0 & 0 & 0 & 1 \\ 0 & 0 & -\omega_1^2 & -2\zeta_1\omega_1 \end{pmatrix}$$

$$b_{pn} = \begin{pmatrix} 0 \\ 0 \\ 0 \\ \omega_1^2 \end{pmatrix}$$

$$c_{pn} = (1 \; 0 \; 0 \; 0)$$

In the above equation, symbol y denotes a radius-direction position to the magnetic disk 1 of the magnetic head and symbol $\theta$ denotes a rotation angle of an actuator, which are shown by a relation of $y = ky \times \theta$. Moreover, a ruby "." (dot) denotes time differentiation and q1 denotes the state variable of a vibration mode. Moreover, as for the equation $kv = kt/J$, kt denotes a torque constant of a motor configured by the driving coil 3c and the permanent magnet 3d and J denotes the moment of inertia of an actuator about the rotation center. Symbols $\zeta_1$ and $\omega_1$ denote a damping coefficient and a resonance angle frequency of the first vibration mode and b11 and b12 denote transfer coefficients.

A system obtained by digitizing the above state equation with a sampling cycle Ts from which a servo signal is obtained is shown by the following (Equation 2).

$$X_n[i+1] = A_{pnd} X_n[i] + b_{pnd} u[i]$$

$$y[i] = C_{pn} X_n[i]$$

$$A_{pnd} = \exp[A_{pn} T_s]$$

$$b_{pnd} = \int_0^{T_s} \exp[A_{pn} \tau] d\tau \cdot b_{pn}$$

$$C_{pn} = (1 \; 0 \; 0 \; 0) \quad \text{(Equation 2)}$$

In the above Equation 2, the subscript [i] of each variable denotes a sampling time ($= i \times T_s$).

A state estimator (observer) shown by the following (Equation 3) is configured by the controller in accordance with the state equation (Equation 2). In the following Equation 3, symbol ^denotes each state variable or an estimated value of a state variable vector. Moreover, symbol k denotes an observer gain.

$$\hat{X}_n[i+1] = A_{pnd} \hat{X}_n[i] + b_{pnd} u[i] + k(y[i] - \hat{y}[i])$$

$$\hat{y}[i] = c_{pn} \hat{X}_n[i] \quad \text{(Equation 3)}$$

Then, a state-feedback controlled variable is computed by the first vibration mode and rigid-body mode estimated by the observer in accordance with the following (Equation 4). In (Equation 4), symbol f denotes a state feedback gain.

$$u[i] = f_y \cdot (r[i] - \hat{y}[i]) - f_r \cdot \hat{X}_{nr}[i]$$

$$\hat{X}_n[i] = (\hat{y}[i], \hat{X}_{nr}[i])$$

$$f = (f_y, f_r) \quad \text{(Equation 4)}$$

Figure 4:
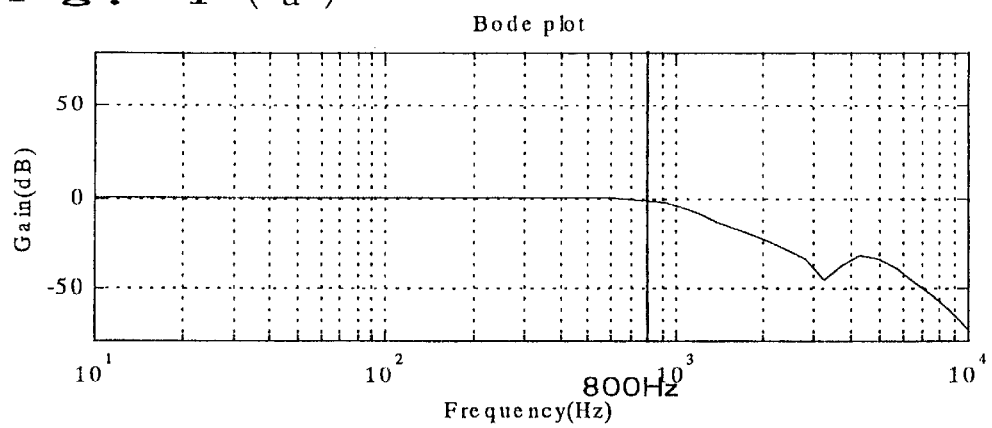
FIG. 4 shows frequency-response characteristic diagrams of a closed-loop characteristic of a magnetic disk unit of the first embodiment.
Figure 4:
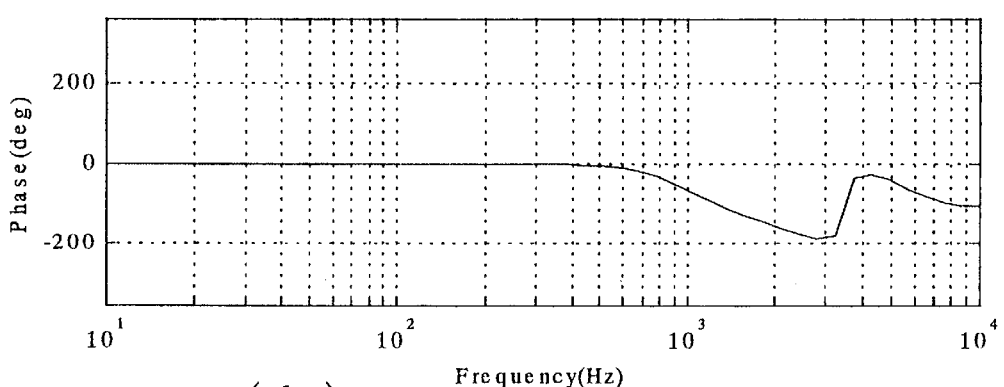
Figure 4:
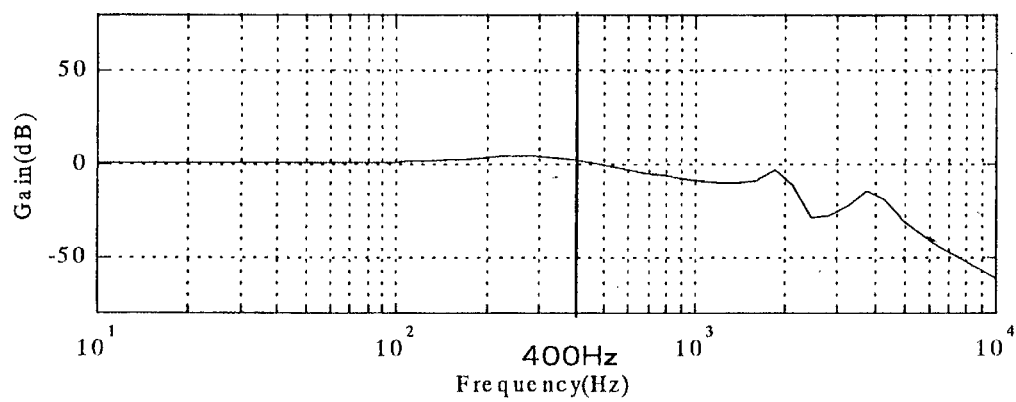
Figure 4:
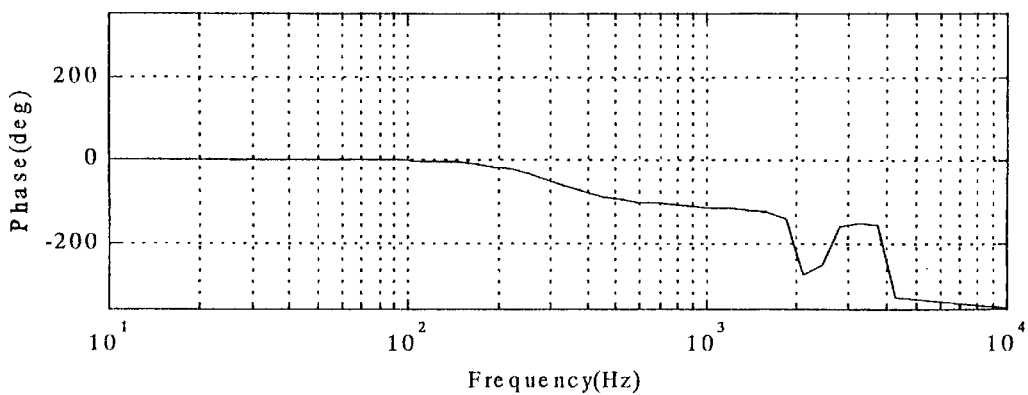

FIG. 4(a) shows the frequency response characteristic of a closed-loop transfer function when the controller is configured as described above FIG. 4(b) shows a characteristic when a conventional phase compensation filter, for reference is used. Though the control bandwidthwidth is 400 Hz in case of the conventional method {FIG. 4(b)}, it is expanded up to 800 Hz in case of this embodiment {FIG. 4(a)}. This is because a control input corresponding to the vibration state of an actuator can be generated every moment by configuring an observer including the vibration mode of the actuator as an internal model and configuring a state-feedback control system using a state variable thereby estimated and thereby, it is possible to further expand a control bandwidthwidth than ever. Therefore, the track-following accuracy of the magnetic head 2 is improved and the capacity of a magnetic disk unit can be increased.

For this embodiment, an internal model including only one vibration mode is configured as an observer. However, it is also possible to include a plurality of vibration modes in the model.

Embodiment 2

Then, the second embodiment of the present invention will be described below. The second embodiment is different only in the controlled-variable computing section 4b, internal configuration, and operations of the first embodiment. Portions of the internal configuration of a controller 4 different from those of the embodiment 1 will be described below in detail.

Figure 5:
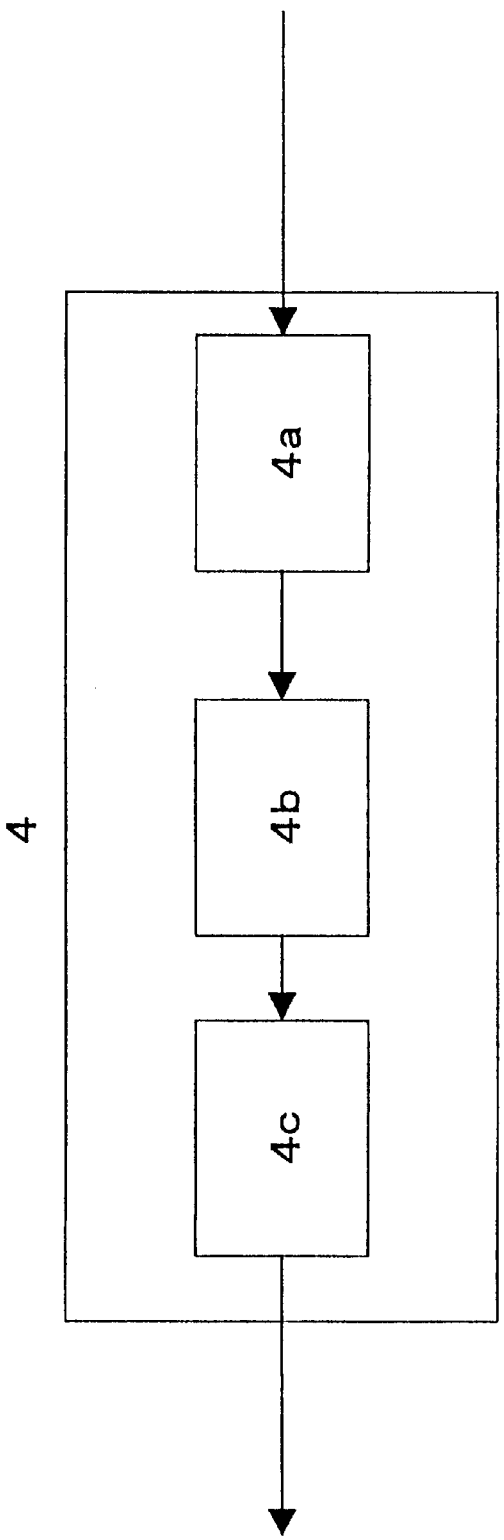
FIG. 5 shows an illustration for explaining the configuration of a controller of a second embodiment.

FIG. 5 shows the configuration of the controller 4. Similarly to the first embodiment, symbol 4a denotes a servo-signal detecting section for detecting a servo signal on a magnetic disk 1 and converting the signal into a digital signal, 4b denotes a controlled-variable computing section for computing a controlled variable for positioning a magnetic head 2 on a track in accordance with detected servo information, and 4c denotes a digital-analog converting section for converting a digitally-computed controlled variable into an analog control signal.

Figure 6:
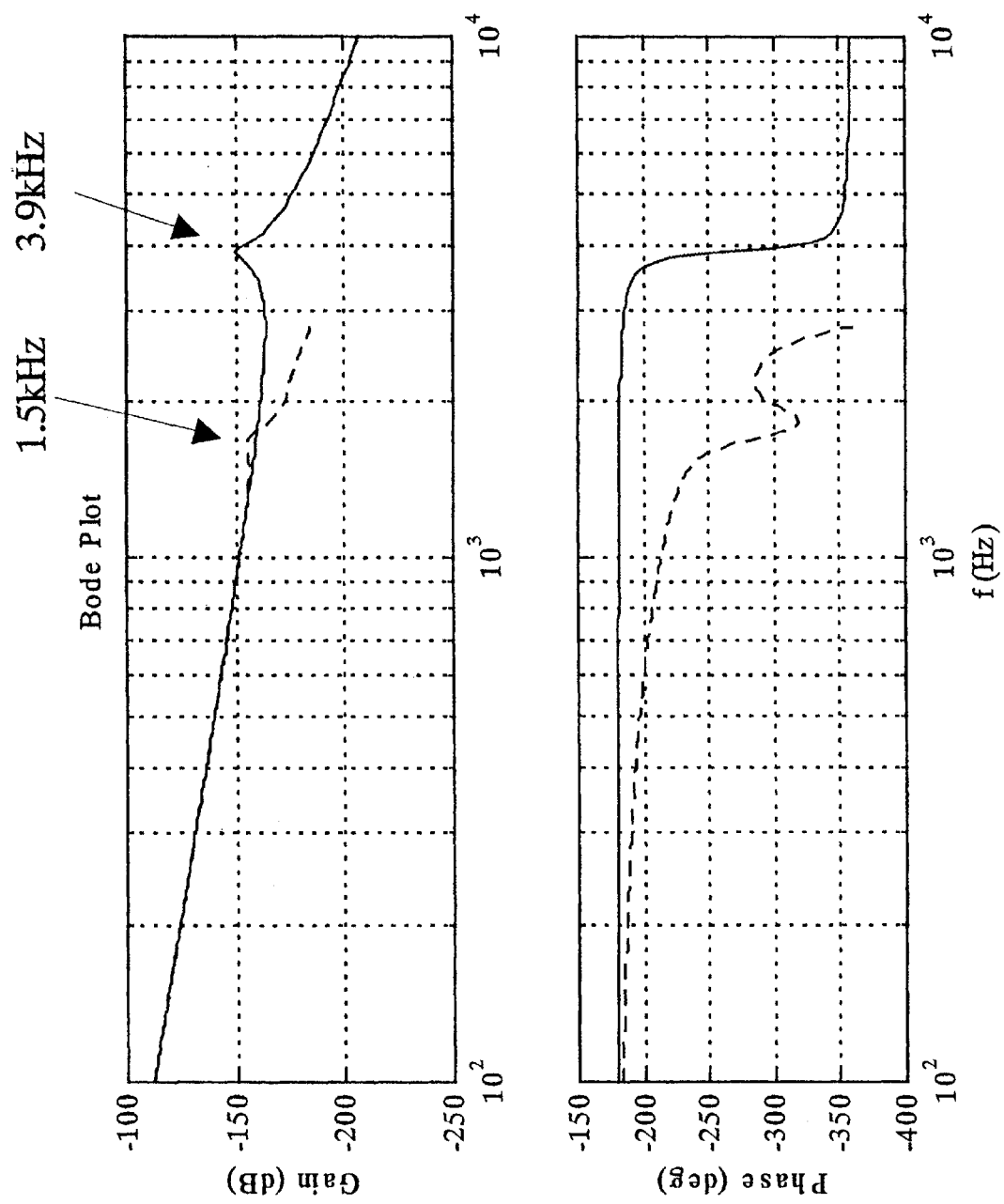
FIG. 6 shows frequency-response characteristic diagrams of an actuator of the second embodiment.

The operation algorithm of the controlled-variable computing section 4b will be described below. FIG. 6 shows frequency-response characteristics of an actuator 3 of this embodiment (the actuator 3 of this embodiment is different from that of the first embodiment in characteristics). In case of the digital control system like this embodiment, an alias vibration mode folded at a Nyquist frequency fs/2 which is ½ of the sampling frequency fs appears due to the relation between the resonance frequency f1 and sampling frequency fs of the vibration mode (in case of this embodiment, fs=5400 Hz). In FIG. 6, a continuous line shows the original frequency-response characteristic of an actuator, and a broken line shows a frequency-response characteristic digitized due to sampling. Though the original resonance frequency of the vibration mode is close to 3.9 kHz, an alias vibration mode occurs at approx. 1.5 kHz due to sampling. The controller 4 is designed for the digitized frequency-response characteristic. However, when a digital phase compensation filter serving as a conventional operation algorithm is used, a phase delay occurs due to an alias vibration mode nearby 1.5 kHz of the actuator and thereby, a control bandwidthwidth can be expanded only up to approx. 600 Hz.

Therefore, this embodiment considers an alias vibration mode corresponding to the original vibration mode of the actuator 3 serving as the largest factor for preventing a control bandwidthwidth from expanding. First, the state equation of the actuator 3 is shown by the following (Equation 5) by assuming a state variable vector as xp and an input current as u.

$$x_n = (y \ \dot{\theta} \ q_1 \ \dot{q}_1)^t$$ (Equation 5)

$$\dot{x}_p = A_p x_p + b_p u$$

$$y = c_p x_p$$

$$A_p = \begin{pmatrix} 0 & ky & 0 & 0 \\ 0 & 0 & kvb_{11} & kvb_{12} \\ 0 & 0 & 0 & 1 \\ 0 & 0 & -\omega_1^2 & -2\zeta_1\omega_1 \end{pmatrix}$$

$$b_p = \begin{pmatrix} 0 \\ 0 \\ 0 \\ \omega_1^2 \end{pmatrix}$$

$$c_p = (1 \ 0 \ 0 \ 0)$$

In the above (Equation 5), y denotes a radius-directional position to the magnetic disk 1 of the magnetic head and θ denotes a rotation angle of an actuator which is shown by a relation of y=ky×θ. Moreover, a ruby "." (dot) denotes time differentiation and q1 denotes the state variable of the original vibration mode of the actuator 3. Furthermore, as for the equation kv=kt/J, kt denotes a torque constant of a motor configured by the driving coil 3c and the permanent magnet 3d and J denotes the moment of inertia of an actuator about the rotation center. Symbol ζ1 denotes a damping coefficient of the original vibration mode and ω1 denotes a resonance angle frequency of the mode, and b11 and b12 respectively denote a transfer coefficient.

A system obtained by digitizing the above state equation with a sampling cycle Ts from which a servo signal is obtained is shown by the following (Equation 6).

$$X_p[i+1] = A_{pd} X_p[i] + b_{pd} u[i]$$

$$y[i] = c_p X_p[i]$$

$$A_{pd} = \exp[A_p T_s]$$

$$b_{pd} = \int_0^{T_s} \exp[A_p \tau] d\tau \cdot b_p$$

$$C_p = (1 \ 0 \ 0 \ 0)$$ (Equation 6)

In the above (Equation 6), the subscript [i] of each variable denotes a sampling time (=i×Ts).

The digitized state equation (Equation 6) already includes an alias vibration mode (frequency fa=fs−f1) folded at a Nyquist frequency (fs/2) instead of the original vibration mode {frequency f1=107 1/(2π)}. Therefore, a state estimator (observer) shown by (Equation 7) is configured in the controller in accordance with the state equation (Equation 6). In the above (Equation 6), symbol ^denotes each state variable or the estimated value of a state variable vector. Moreover, symbol k denotes an observer gain.

$$\hat{X}_p[i+1] = A_{pd} \hat{X}_p[i] + b_{pd} u[i] + k(y[i] - \hat{y}[i])$$

$$\hat{y}[i] = c_p \hat{X}_p[i]$$ (Equation 7)

Then, a state-feedback controlled variable is computed by using state variables of an alias vibration mode and rigid-body mode estimated by the observer in accordance with (Equation 8). In the following (Equation 8), symbol f denotes a state feedback gain.

$$u[i]=f_y \cdot (r[i]-\hat{y}[i])-f_r \cdot \hat{X}_{pr}[i]$$

$$\hat{X}_p[i]=(\hat{y}[i],\hat{X}_{pr}[i])$$

$$f=(f_y,f_r) \qquad \text{(Equation 8)}$$

Figure 7:
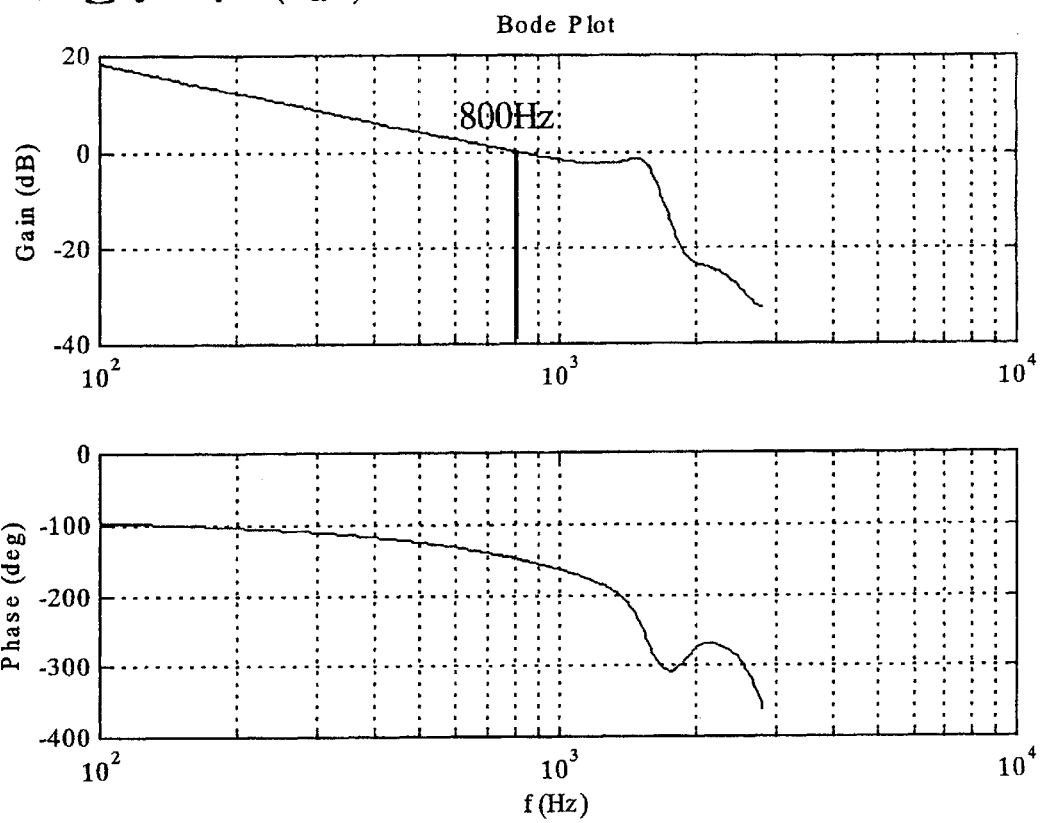
FIG. 7 shows frequency-response characteristic diagrams and a time-response diagram of a closed-loop characteristic of a magnetic disk unit of the second embodiment.
Figure 7:
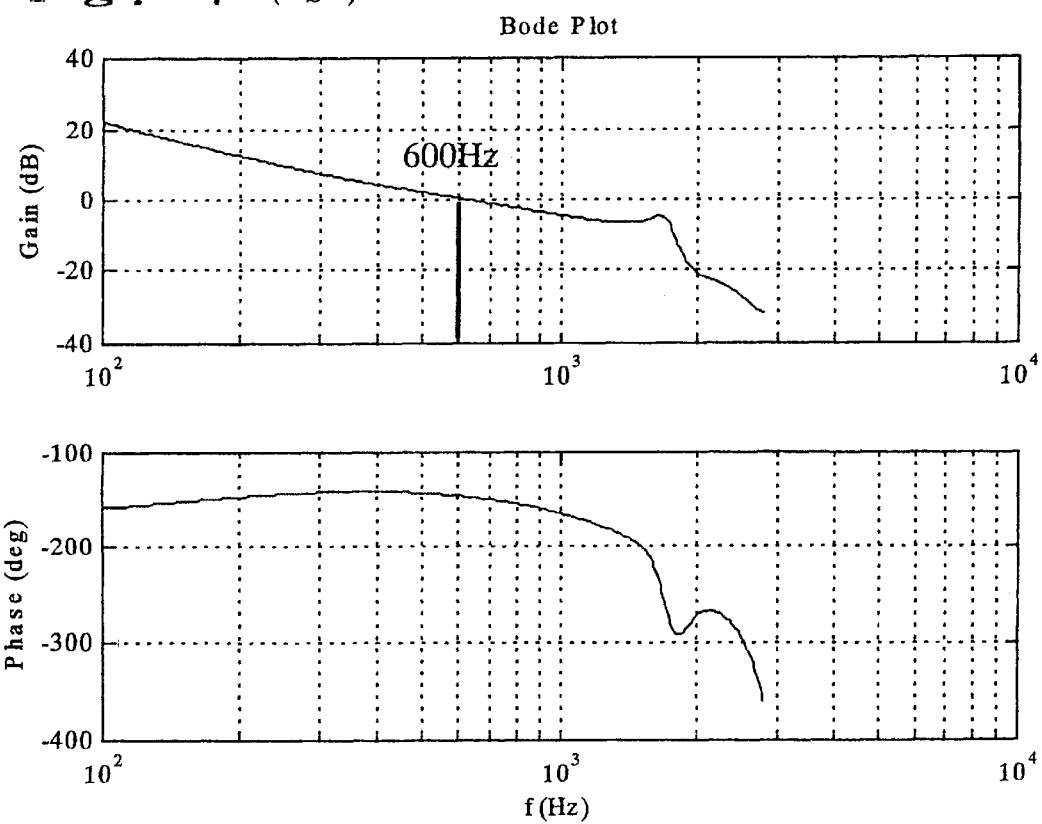
Figure 7C:
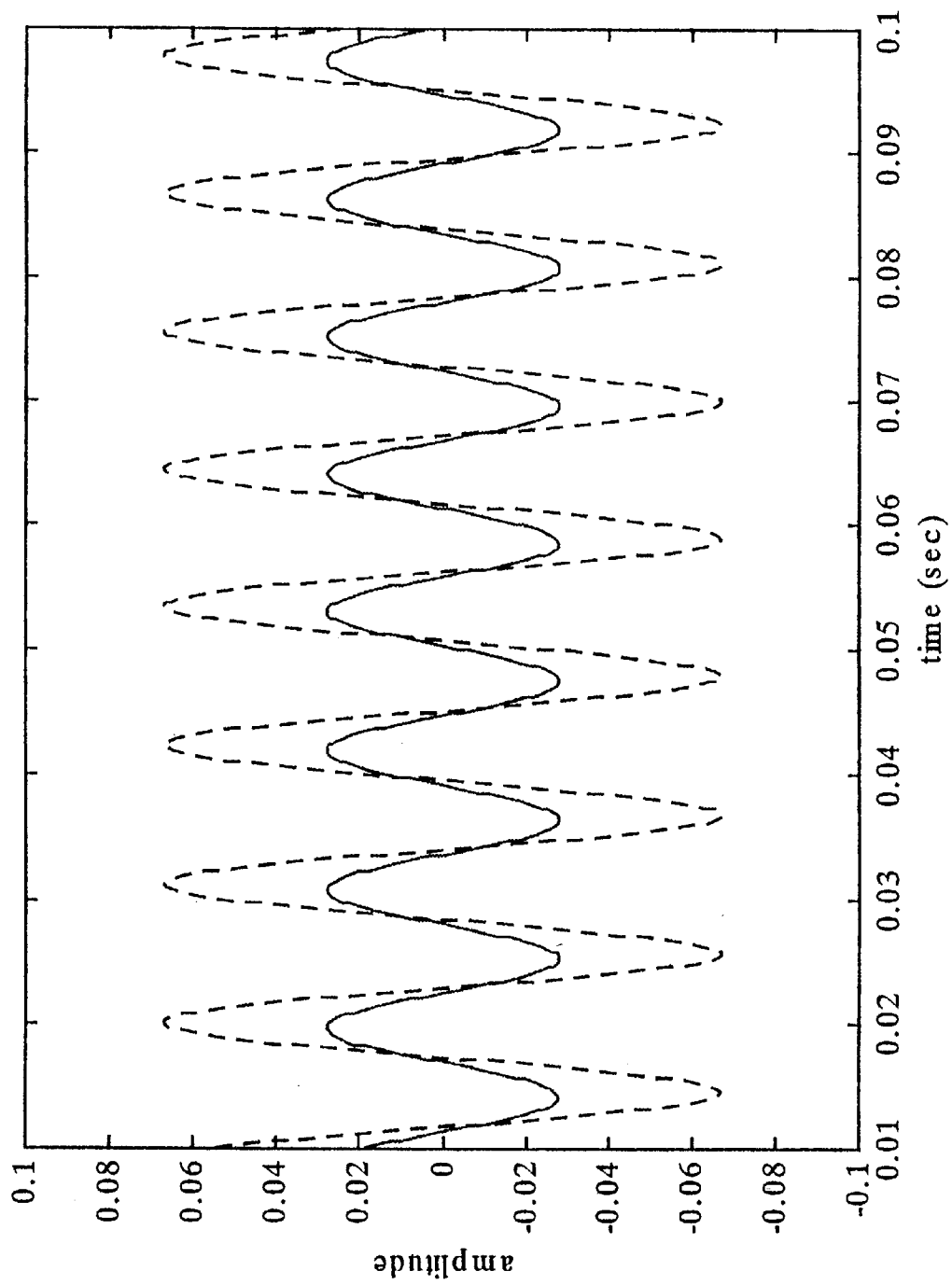

FIG. 7(a) shows frequency-response characteristics of a closed-loop transfer function when configuring the controller as described above. FIG. 7(b) shows characteristics when using a conventional phase compensation filter, for reference. Though the control bandwidthwidth is 600 Hz in case of a conventional method {FIG. 7(b)}, the control bandwidthwidth is expanded up to 800 Hz in the case of this embodiment {FIG. 7(a)}. Moreover, though positions of a target track are changed due to decentering and vibration, the primary rotational sync component is largest among the factors including decentering and vibration in general. In case of this embodiment, the frequency is set to 90 Hz (=5400/60). FIG. 7(c) shows positioning errors of the magnetic head 2 to a target track when the primary rotational sync position fluctuation is added. The conventional case is shown by a broken line and the case of the present invention is shown by a continuous line for comparison. As shown in FIG. 7(c), it is found that the positioning error is reduced. This is because a control input corresponding to the vibrational state of an actuator can be generated every moment by configuring an observer including the vibration mode of the actuator in the controlled-variable computing section 4b of the controller 4 as an internal model in the form of an alias vibration mode and moreover configuring a state-feedback control system by using a state variable estimated by the observer and thereby, it is possible to further expand a control bandwidth than ever. Therefore, the track-following accuracy of the magnetic head 2 is improved and the capacity of a magnetic disk unit can be increased.

As for this embodiment, an internal model including only one alias vibration mode is configured as an observer. However, it is possible for the internal model to include a plurality of vibration modes or include a plurality of alias vibration modes or the original vibration mode (having a resonance frequency equal to or lower than a Nyquist frequency).

Embodiment 3

Then, the third embodiment of the present invention will be described below. The third embodiment is different only in the controlled-variable computing. section 4b, internal configuration, and operations of the first embodiment.

That is, in case of the first embodiment, the sate estimator (observer) and state-feedback controlled-variable computing section performs the above operation whenever a servo signal is detected, that is, at the cycle Ts of the frequency fs. Thereby, the observer is able to estimate a state variable by including a vibration mode having a resonance frequency fs/2 or lower in an internal model in accordance with the sampling theorem and perform the state-feedback control based on the estimated value. However, to configure an observer for a vibration mode having a higher resonance frequency as an internal model among vibration modes of an actuator in order to further expand a control bandwidth, it is impossible to estimate the state variable of a vibration mode having a frequency of fs/2 or higher because of the sampling theorem Moreover, there is a problem that the estimation accuracy is lowered if the resonance frequency of a vibration mode having a frequency fs/2 or lower is close to fs/2 and resultantly, the control performance is deteriorated, that is, the positioning accuracy is lowered or the transient response is deteriorated. This problem can be avoided by raising a servo-signal detection frequency fs. However, raising the frequency fs only increases the number of servo signals for one round. As a result, the rate of a servo region occupying a disk increases and the size of an information-recordable/reproducible data region decreases, conflicting with the request for capacity increase.

Therefore, this embodiment accurately estimates a vibration mode by configuring a multi-rate sampling system for estimating an observer and computing a controlled variable while signals are detected without increasing the number of servo signals.

Figure 8:
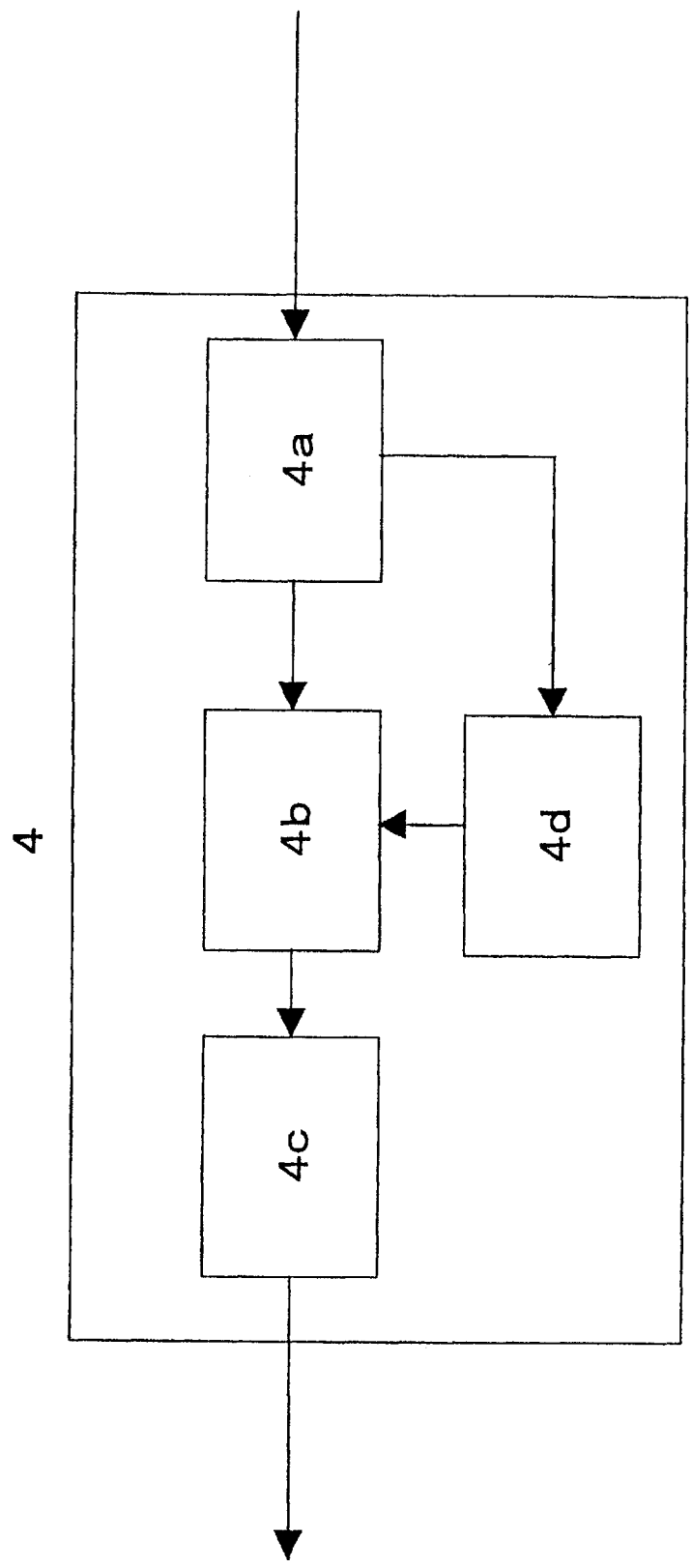
FIG. 8 shows an illustration for explaining the configuration of a controller of a third embodiment of the present invention.

FIG. 8 shows an illustration of the internal configuration of the controller 4 of this embodiment. Similarly to the case of the first embodiment, symbol 4a denotes a servo-signal detecting section for detecting a servo signal, on the magnetic disk 1 and converting it into a digital signal, 4b denotes a controlled-variable computing section for computing a controlled variable for positioning the magnetic head 2 on a track in accordance with detected servo information, and 4c denotes a digital-analog converting section for converting a digitally-computed controlled variable into an analog control signal.

This embodiment is different from the first embodiment in that a frequency dividing section is used which outputs a timing clock at a cycle ⅕ the servo-signal detection cycle Ts at the detection timing of the servo-signal detecting section. The controlled-variable computing section 4b operates in accordance with the output of the servo-signal detecting section 4a and that of the frequency dividing section 4d. In case of this embodiment, Ts equals 0.027 ms.

The operation algorithm of the controlled-variable computing section 4b will be described below. This embodiment also uses an actuator 3 showing the frequency-response characteristics in FIG. 3 the same as the first embodiment does and considers up to the first vibration mode. Moreover, an observer for performing estimation at the clock timing of the frequency dividing section 4d is configured to accurately estimate an actuator state variable including the vibration mode. That is, a system obtained by digitizing the state equation of an actuator of (Equation 1) at a cycle of Ts/5 is shown by the following (Equation 9).

$$X_n[j]=A_{pnd2}X_n[j]+b_{pnd2}u[j]$$

$$y[j]=c_{pn}X_n[j]$$

$$A_{pnd2}=exp[A_{pn}Ts/5]$$

$$b_{pnd2} = \int_0^{Ts/5} exp[A_{pn}\tau]d\tau \cdot b_{pn}$$

$$c_{pn}=(1\ 0\ 0\ 0) \qquad \text{(Equation 9)}$$

In the above (Equation 9), the subscript j of each variable denotes a sampling time (=j×Ts/5) based on the frequency division cycle of a servo signal.

A state estimator (observer) shown by the following (Equation 10) is configured in the controller in accordance with the state equation (Equation 9). Symbol k denotes an observer gain.

When $j=5 \cdot m$ (m: integer)

$$\hat{X}_n[j+1]\ A_{pnd2}\hat{X}_n[j]+b_{pnd2}u[j]+k(y[j]-\hat{y}[j])$$

When $j \neq 5 \cdot m$ $$\hat{X}_n[j+1] = A_{pnd2}\hat{X}_n[j] + b_{pnd2}u[j]$$

$$\hat{y}[j] = c_{pn}\hat{X}_n[j] \quad \text{(Equation 10)}$$

As shown by (Equation 10), a configuration is used in which estimation is performed by using the estimation error of the observer and the controlled variable u[j] only when detecting a servo signal (j=5×m, m: integer) and by using only the controlled variable u[j] in the cases other than the above case (j≠5×m). This configuration makes it possible to accurately and stably estimate a state variable while servo signals are detected.

Then, a state-feedback controlled variable is computed by using state variables of the first vibration mode and rigidity-body mode estimated by the observer in accordance with the following (Equation 11). In the following (Equation 11), symbol f denotes a state feedback gain.

$$u[j] = fy \cdot (r[j] - \hat{y}[j]) - f_r \cdot \hat{X}_{nr}[j]$$

$$\hat{X}_n[j] = (\hat{y}[j], \hat{X}_{nr}[j])$$

$$f = (fy, f_r) \quad \text{(Equation 11)}$$

Figure 9:
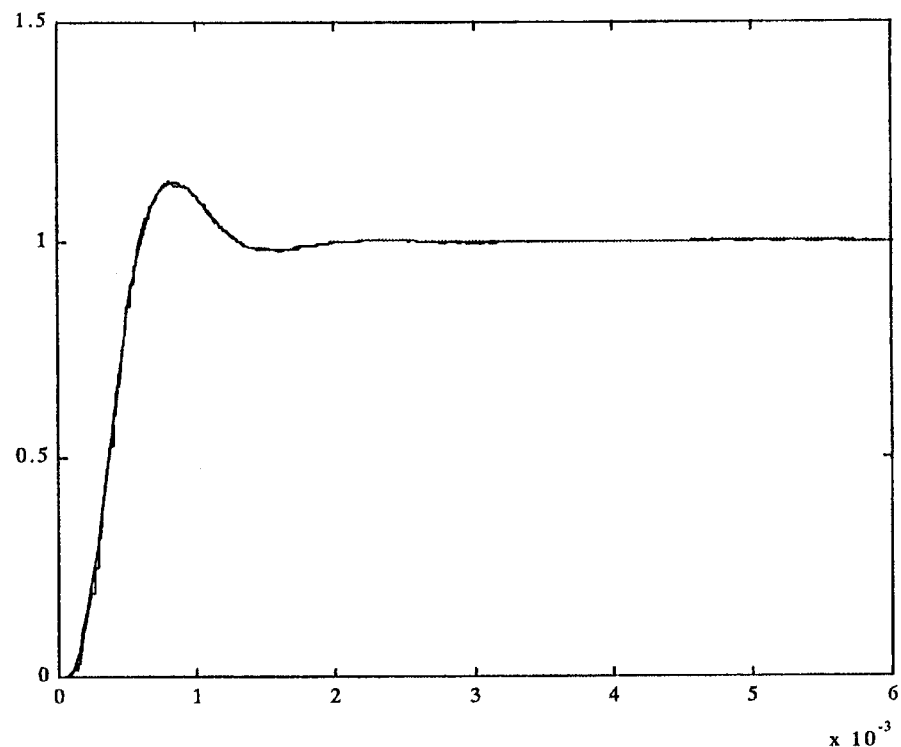
FIG. 9 shows step-response characteristic diagrams of a magnetic disk unit of the third embodiment.
Figure 9:
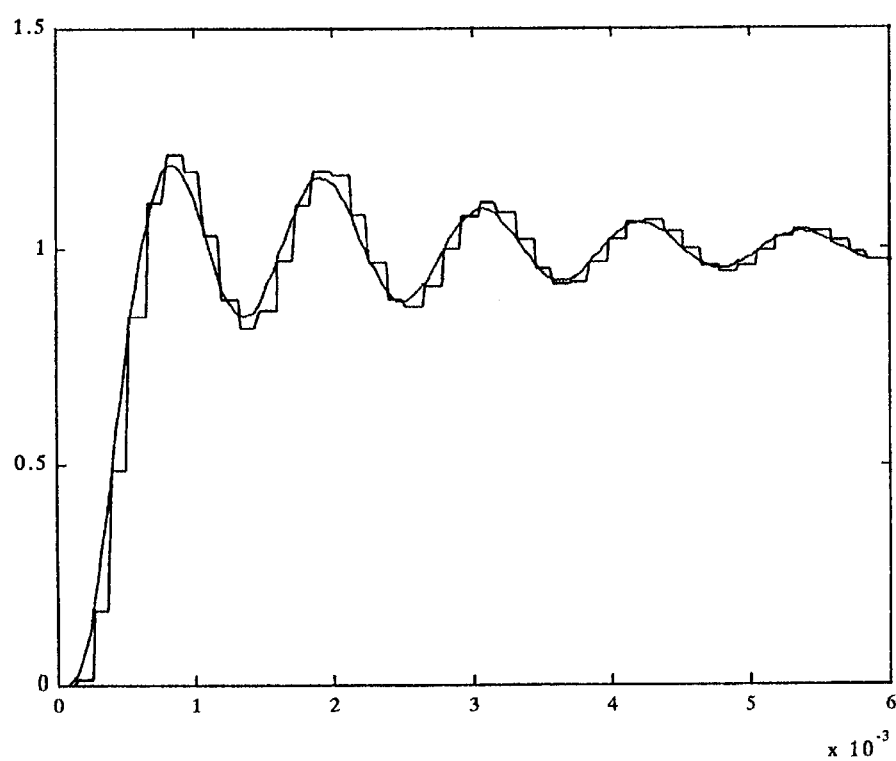

FIG. 9(a) shows a step response waveform when the controller is configured as described above. FIG. 9(b) shows the response characteristic for the first embodiment of the present invention, for reference. From FIG. 9(b), it is found that the transient response characteristic is extremely preferable. in case of this embodiment, the operation cycle of the observer is set to a value ⅕ the cycle of a servo signal. However, an operation cycle is not necessarily restricted to the above value. It is possible to estimate the state variable of a vibration mode having a higher resonance frequency as the operation cycle is shortened. Therefore, it is possible to select an operation cycle in accordance with the performance of a microcomputer used and a control bandwidth or control performance required.

Embodiment 4

Then, the fourth embodiment of the present invention will be described below. The fourth embodiment is different only in the internal configuration of the controlled-variable computing section 4b and operations of the second embodiment.

The operation algorithm of the controlled-variable computing section 4b will be described below. The actuator 3 of this embodiment shows the frequency-response characteristic same as the characteristic shown in FIG. 6 (different from the first and third embodiments in the characteristic of the actuator 3). In case of the digital control system like this embodiment, however, an alias vibration mode folded at the Nyquist frequency fs/2 which is ½ the sampling frequency fs appears due to the relation between the resonance frequency f1 and sampling frequency fs (=5400 Hz) in a vibration mode. That is, as described above, though the resonance frequency of the original vibration mode is approx. 3.9 kHz, an alias vibration mode occurs at a frequency of approx. 1.5 kHz due to sampling. In this case, when the state estimator (observer) and state-feedback controlled-variable computing section perform the above operation whenever a servo signal is input, that is, at the cycle Ts of the frequency fs, the observer is able to estimate the state variable of a vibration mode having a resonance frequency fs/2 or lower or that of an alias mode by including it in an internal model because of the sampling theorem. However, to further expand a control region, an observer capable of estimating a more high-speed and accurate vibration mode is necessary. This can be also realized by raising the servo-signal detection frequency fs. However, raising the frequency fs only increases the number of servo signals for one round of a track. As a result, the rate of a servo region occupying a disk increase and the size of an information recordable/reproducible data region decreases, conflicting with the request for capacity increase.

Therefore, this embodiment accurately estimates a vibration mode by configuring a multi-rate sampling system for estimating an observer and computing a controlled variable while signals are detected without increasing the number of servo signals.

Figure 10:
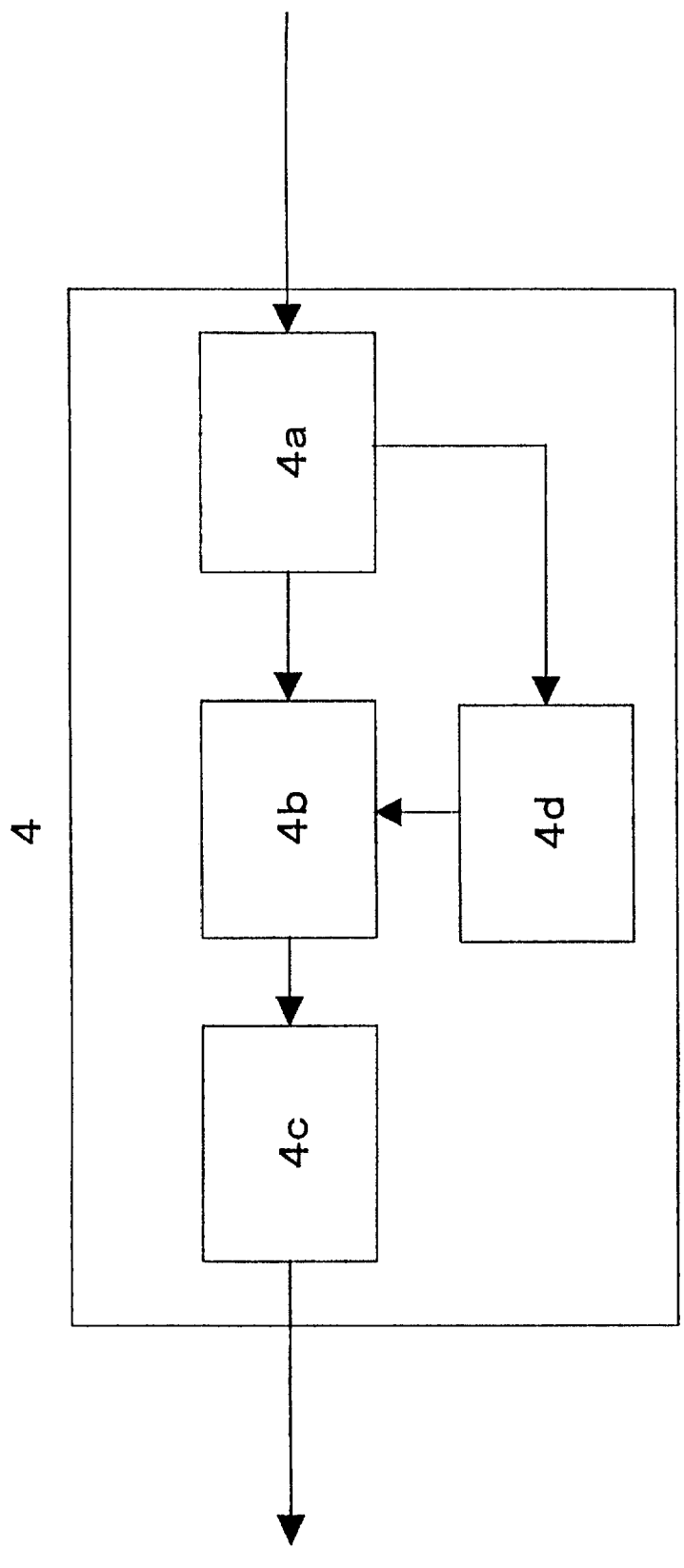
FIG. 10 shows an illustration for explaining the configuration of a controller of a fourth embodiment of the present invention.

FIG. 10 shows an illustration for explaining the internal configuration of a controller of this embodiment. Similarly to the case of the second embodiment, symbol 4a denotes a servo-signal detecting section for detecting a servo signal on the magnetic disk 1 and converting it into a digital signal, 4b denotes a controlled-variable computing section for computing a controlled variable for positioning the magnetic head 2 on a track in accordance with detected positional information, and 4c denotes a digital-analog converting section for converting a digitally-computed controlled variable into an analog control signal.

This embodiment is different from the second embodiment in that a frequency dividing section for outputting a timing clock at a cycle ½ the servo-signal detection cycle Ts in accordance with the detection timing of the servo-signal detecting section is provided. The controlled-variable computing section 4b operates in accordance with the output of the servo-signal detecting section 4a and that of the frequency dividing section 4d. Therefore, the controlled-variable computing section operates at a second sampling frequency fs2 (=2×fs). In the case of this embodiment, fs2 is set to 10.8 kHz.

The operation algorithm of the controlled-variable computing section 4b will be described below. This embodiment also uses an actuator 3 showing the frequency-response characteristics shown in FIG. 6 similarly to the case of the second embodiment. In this case, the controlled-variable computing section 4b is able to estimate the original vibration mode because the frequency of approx. 3.9 kHz (frequency f1) of the mode is lower than the Nyquist frequency (=5.4 kHz); of the second sampling frequency fs2. However, because the servo-signal detecting section performs sampling at the sampling frequency fs (=5.4 kHz), an alias vibration mode of approx. 1.5 kHz in which the original vibration mode is folded at a frequency (Nyquist frequency) which is ½ the sampling frequency fs also appears. Therefore, an observer including the original vibration mode (3.9 kHz) and its alias vibration mode (1.5 kHz) to perform estimation at the clock timing of the frequency dividing section 4d is configured in the controlled-variable computing section. First, the actuator state equation digitized by the cycle Ts shown by (Equation 6) is temporarily inversely-converted into a continuous time system to obtain the continuous time representation of an alias vibration mode. The following (Equation 12) shows a system to which the alias vibration mode is newly added and which is adjusted to a DC gain equal to the original DC gain (=kv×kv) of the actuator 3.

$$x_n = (y\ \theta\ q_a\ \dot{q}_a\ q_1\ \dot{q}_1)^t \quad \text{(Equation 12)}$$

$$\dot{x}_n = A_{pn}x_n + b_{pn}u$$

$$y = c_{pn}x_n$$

-continued $$A_{pn} = \begin{pmatrix} 0 & ky & 0 & 0 & 0 & 0 \\ 0 & 0 & kvb_{a1} & kvb_{a2} & kvb_{11} & kvb_{12} \\ 0 & 0 & 0 & 1 & 0 & 0 \\ 0 & 0 & -\omega_{1a}^2 & -2\zeta_{1a}\omega_{1a} & 0 & 0 \\ 0 & 0 & 0 & 0 & 0 & 1 \\ 0 & 0 & 0 & 0 & -\omega_1^2 & -2\zeta_1\omega_1 \end{pmatrix}$$

$$b_{pn} = \begin{pmatrix} 0 \\ 0 \\ 0 \\ \omega_{1a}^2 \\ 0 \\ \omega_1^2 \end{pmatrix}$$

$$c_{pn} = (1\ 0\ 0\ 0\ 0\ 0)$$

In the above (Equation 12), symbol q1 denotes the state variable of the original vibration mode of the actuator 3 and qa denotes the state variable of an alias vibration mode. Symbol $\zeta 1$ denotes a damping coefficient of the original vibration mode and $\omega 1$ denotes a resonance angle frequency of the mode, symbol $\zeta 1a$ denotes a damping coefficient of an alias vibration mode and $\omega 1a$ denotes a resonance angle frequency of the mode, and $\omega 1$ is equal to $2\pi \times f1$ and $\omega 1a$ is equal to $2\pi \times (fs-f1)$ Moreover, symbols b11', b12', ba1, and ba2 denote transfer coefficients which are adjusted so as to be equal to the DC gain ($=kv \times ky$) of the actuator 3.

The following (Equation 13) shows a system obtained by digitizing the expanded state equation (Equation 12) by a frequency-divided sampling cycle, that is, the cycle Ts/2.

$$X_n[j]=A_{pnd}X_n[j]+b_{pnd}u[j]$$

$$y[j]=c_{pn}X_n[j]$$

$$A_{pnd}=exp[A_{pn}Ts/2]$$

$$b_{pnd}=\int_0^{Ts/2} exp[A_{pn}\tau]d\tau \cdot b_{pn}$$

$$c_{pn}=(1\ 0\ 0\ 0) \quad \text{(Equation 13)}$$

In the above (Equation 13), the subscript j of each variable denotes a sampling time ($=j \times Ts/2$) based on the frequency division cycle of a servo signal.

The state estimator (observer) shown by the following (Equation 14) is configured in the controller in accordance with the state equation (Equation 13). Symbol k denotes an observer gain.

When $j=2 \cdot m$ (m: integer)

$$\hat{X}_n[j+1]=A_{pnd}\hat{X}_n[j]+b_{pnd}u[j]+k(y[j]-\hat{y}[j])$$

When $j \neq 2 \cdot m$ $$\hat{X}_n[j+1]=A_{pnd}\hat{X}_n[j]+b_{pnd}u[j]$$

$$\hat{y}[j]=c_{pn}\hat{X}_n[j] \quad \text{(Equation 14)}$$

As shown by (Equation 14), a configuration is used in which estimation is performed by using the estimation error of the observer and the controlled variable u [j] only when detecting a servo signal (j=2×m, m: integer) and by using only the controlled variable u[j] in the cases other than the above case (j≠2×m). This configuration makes it possible to accurately and stably estimate a state variable while servo signals are detected.

Then, a state-feedback controlled variable is computed by using state variables of the first vibration mode and rigidity-body mode estimated by the observer in accordance with (Equation 15). In the following (Equation 15), symbol fn denotes a state feedback gain.

$$u[j]=f_{ny} \cdot (r[j]-\hat{y}[j])-f_{nr} \cdot \hat{X}_{nr}[j]$$

$$\hat{X}_n[j]=(\hat{y}[j], \hat{X}_{nr}[j])$$

$$f_n=(f_{ny}, f_{nr}) \quad \text{(Equation 15)}$$

By configuring the controller as described above, it is possible to accurately estimate up to a higher-frequency vibration mode by the observer even during a sampling cycle and improve the transient characteristic and positioning accuracy.

As for this embodiment, the operation cycle of the observer is set to a value ½ the cycle of a servo signal. However, the operation cycle is not necessarily restricted to the above value. It is possible to estimate the state variable of a vibration mode having a higher resonance frequency as an operation cycle is further shortened. Therefore, it is possible to select an operation cycle in accordance with the capacity of a microcomputer used and a control bandwidth or control performance required.

Embodiment 5

Then, the fifth embodiment of the present invention will be described below.

Figure 11:
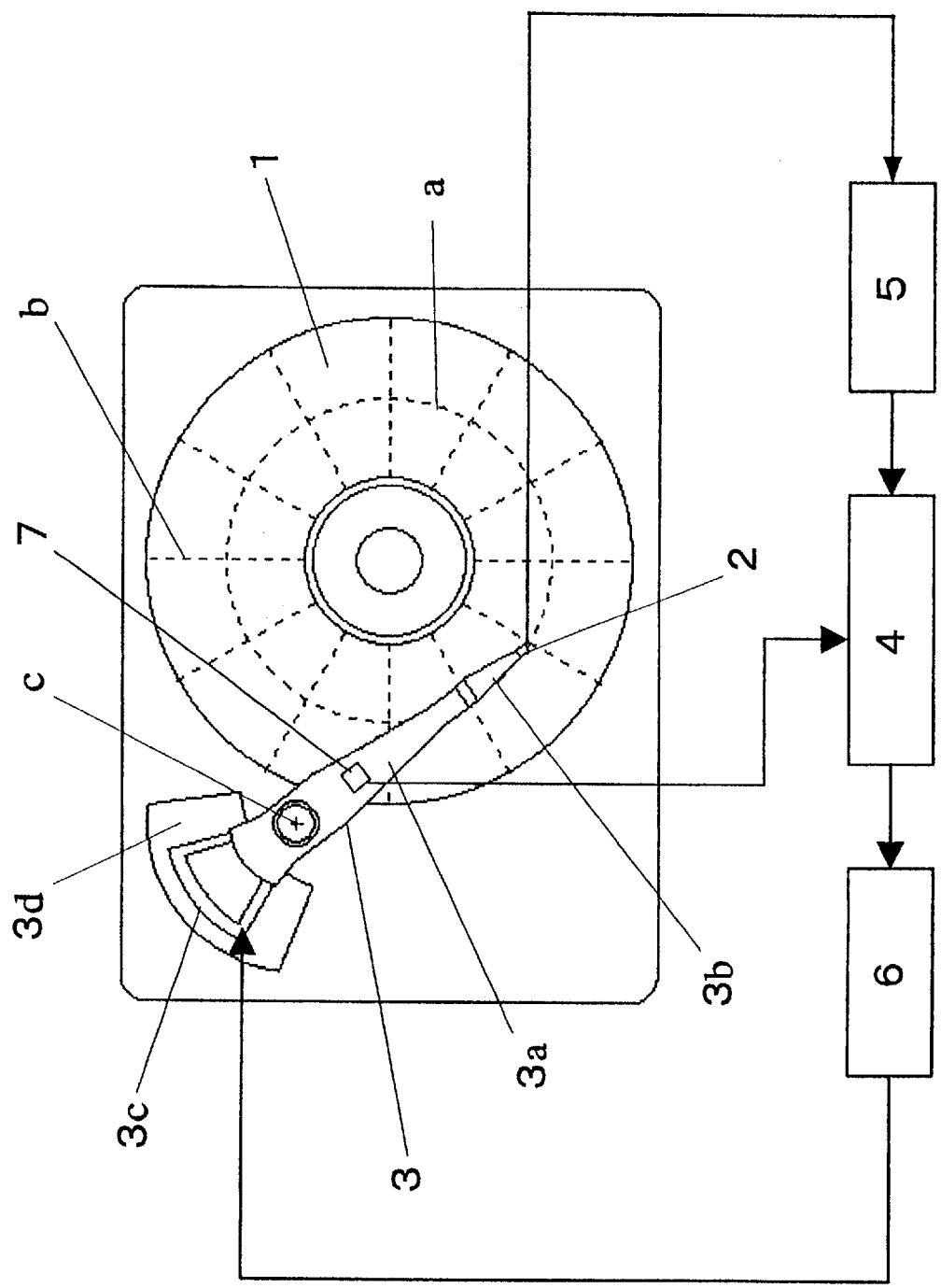
FIG. 11 shows a schematic block diagram of a magnetic disk unit of a fifth embodiment of the present invention.

FIG. 11 shows a schematic block diagram of a magnetic disk unit showing an embodiment of the present invention. This embodiment is different from the first and third embodiments only in that an acceleration sensor 7 for detecting the acceleration of an actuator in the rotational direction is provided, and in the internal configuration of a controller 4. Therefore, description of common portions is omitted.

Figure 12:
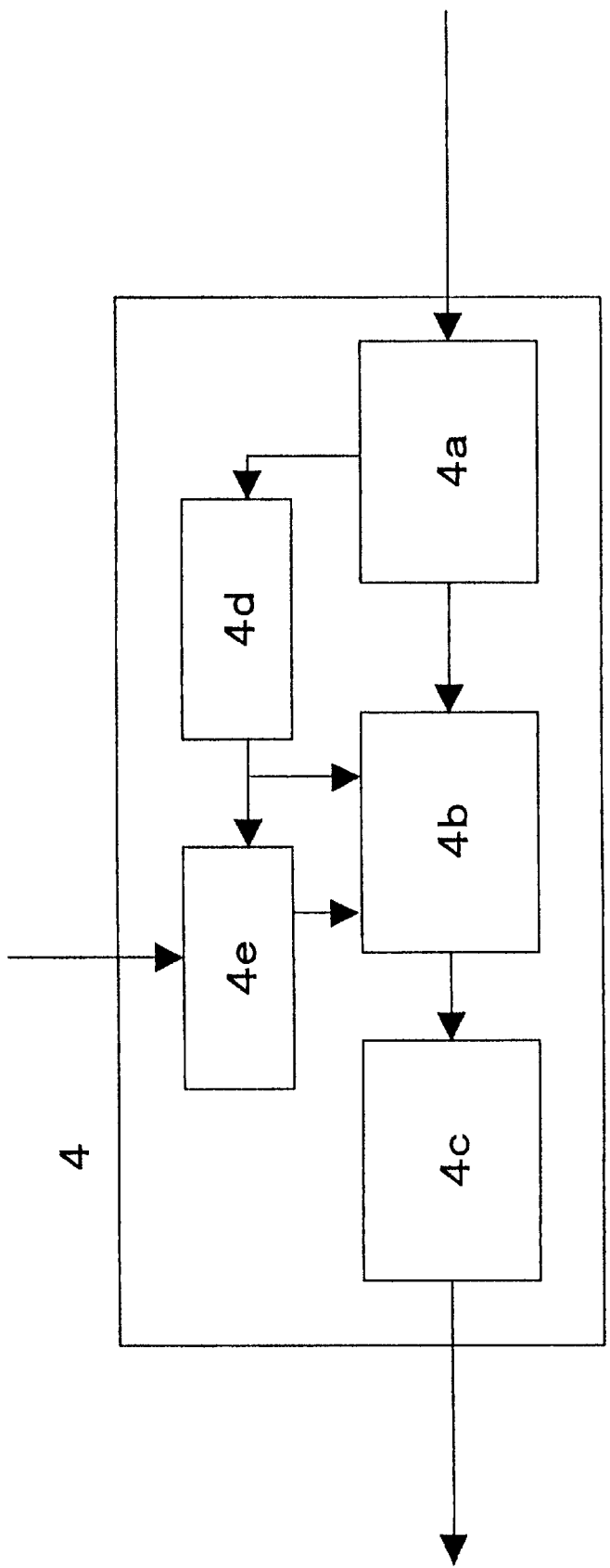
FIG. 12 shows an illustration for explaining the configuration of a controller of the fifth embodiment.

FIG. 12 shows a schematic block diagram of the controller 4. In FIG. 12, symbols 4a, 4c, and 4d are the same as those of the embodiment 3. Symbol 4e denotes an acceleration signal converting section for analog-to-digital-converting the signal of an acceleration sensor 7 into the angular acceleration of the rotational motion of an actuator, which performs conversion at the timing of the clock signal of the frequency dividing section 4d. Moreover, the converted value is outputted to a controlled-variable computing section 4b.

The operation algorithm of the controlled-variable computing section 4b will be described below. This embodiment also uses an actuator 3 showing the frequency-response characteristic shown in FIG. 3 similarly to the case of the first and third embodiments and considers up to the first vibration mode. Moreover, to accurately estimate an actuator state variable including the vibration mode, a vibration mode observer for estimating only the vibration mode at the clock timing of the frequency dividing section 4d and a rigid-body mode observer for estimating a rigid-body mode at the servo-signal detection timing are configured.

First, the vibration mode model of an actuator is shown by (Equation 16) and the rigid-body mode model of the actuator is shown by (Equation 17).

$$X_{dn}=(q_1\ \dot{q}_1)^t$$

$$\dot{X}_{dn}=A_{dn}X_{dn}+b_{dn}u$$

$$y_d=[|\$]\$"g\ddot{v}=c_{dn}X_{dn}$$

$$A_{dn} = \begin{pmatrix} 0 & 1 \\ -\omega_1^2 & -2\zeta_1\omega_1 \end{pmatrix}$$

$$b_{dn} = \begin{pmatrix} 0 \\ \omega_1^2 \end{pmatrix}$$

$c_{dn} = (kvb_{11}\, kvb_{12})$ (Equation 16)

$X_r = (y\,\dot\theta)^t$ $\dot X_r = A_r + b_r y_d$ $y = c_r X_r$ $$A_r = \begin{pmatrix} 0 & ky \\ 0 & 0 \end{pmatrix}$$

$$b_r = \begin{pmatrix} 0 \\ 1 \end{pmatrix}$$

$c_r = (1\ 0)$ (Equation 17)

Symbol xdn denotes the state variable of the vibration mode and xr denotes that of the rigid-body mode. Moreover, yd denotes an angular acceleration corresponding to the output signal of an acceleration sensor. Other symbols are the same as the case of the embodiment 1.

The vibration mode observer is configured as shown by the following (Equation 19) by using the following state equation (Equation 18) for the first vibration mode of an actuator digitized with a cycle Ts/5.

$X_{dn}[j+1] = A_{dnd} X_{dn}[j] + b_{dnd} u[j]$ $yd[j] c_{dn} X_{dn}[j]$ $A_{dnd} = exp[A_{dn} Ts/5]$ $b_{dnd} = \int_0^{Ts/5} exp[A_{dn}\tau] d\tau \cdot b_{dn}$ $c_{dn} = (kvb_{11}\, kvb_{12})$ (Equation 18)

$\hat X_{dn}[j+1] = A_{dnd}\hat X_{dn}[j] + b_{dnd} u[j] + k(y_d[j] - \hat y_d[j])$ $\hat y_d[j] = c_{dn}\hat X_{dn}[j]$ (Equation 19)

Moreover, the rigid-body mode observer is configured as shown by the following (Equation 21) by using the following state equation (Equation 20) for the rigid-body mode of an actuator digitized with a cycle Ts.

$X_r[i+1] = A_{rd} X_r[i] + b_{rd} y_d[i]$ $y[i] = c_r X_r[i]$ $A_{rd} = exp[A_r Ts]$ $b_{rd} = \int_0^{Ts} exp[A_r\tau] d\tau \cdot b_r$ $c_r = (1\ 0)$ (Equation 20)

$\hat X_r[i+1] A_{rd} X_r[i] + b_{rd} y_d[i]$ $\hat y[i] = c_r X_r[i]$ (Equation 21)

According to the above configuration, it is possible to accurately estimate a vibration mode every moment in accordance with the signal of an acceleration sensor even while servo signals are not detected and resultantly, it is possible to expand a control bandwidth and realize a preferable control characteristic.

A state-feedback controlled variable is computed and output by using estimated values of the above state variables in accordance with the following (Equation 22).

$u[j] = fy \cdot (r[i] - \hat y[i]) - f\dot\theta \cdot \dot\theta[i] - f_d \hat X_{dn}[j]$ $f = (fy\ f\dot\theta\ f_d)$ (Equation 22)

In the above (Equation 22), symbols i and j respectively denote a sampling time described for the first and third embodiments and the value of a variable shown by the time i is updated every time Ts and that of a variable shown by the time j is updated every time Ts/5. Moreover, symbol f denotes a feedback gain.

Figure 13:
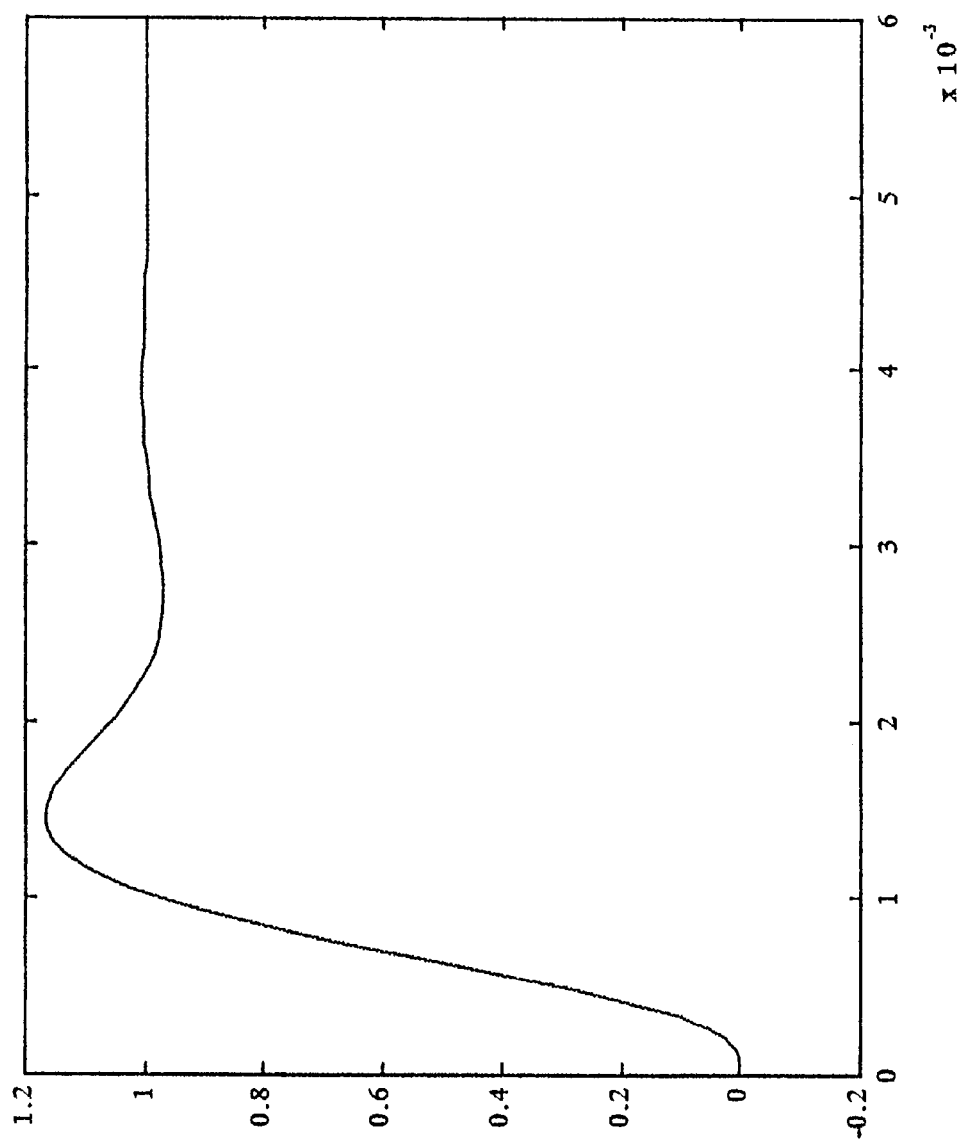
FIG. 13 shows step-response characteristic diagrams of a magnetic disk unit of the fifth embodiment.

FIG. 13 shows the transient response characteristic in the above case. From FIG. 13, it is found that a preferable transient response characteristic is obtained similarly to the case of the embodiment 3 {FIG. 9(a)}.

As for the embodiments 3 and 5, the result of improving a transient response characteristic is shown. At the same time, there is an advantage of improving the positioning accuracy. Moreover, as described for the embodiment 3, a frequency division ratio is not restricted to 5. It is possible to determine the ratio by considering a necessary performance and the capacity of a usable hardware resource.

Embodiment 6

Then, the sixth embodiment of the present invention will be described below.

Figure 14:
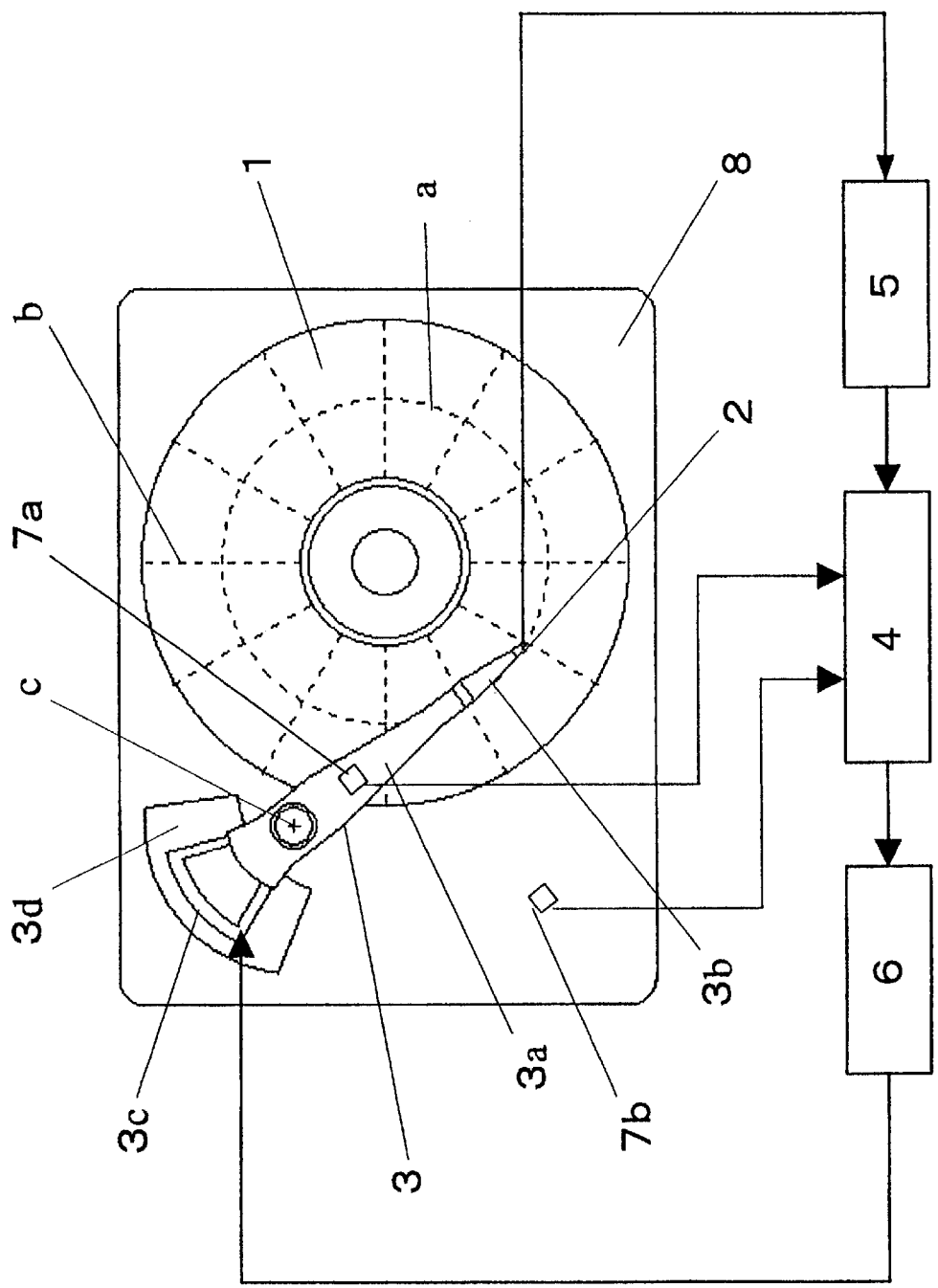
FIG. 14 shows a schematic block diagram of a magnetic disk unit of a sixth embodiment of the present invention.

FIG. 14 shows a schematic block diagram of a magnetic disk unit showing an embodiment of the present invention. This embodiment is different from the fourth embodiment only in that acceleration sensors 7a and 7b for detecting the acceleration of an actuator in the rotational direction are respectively set on an actuator 3 and a base 8 to which the actuator 3 is provided, and in the internal configuration of a controller 4. Therefore, description of common portions is omitted. In this case, the acceleration sensors 7a and 7b are set so as to have a sensitivity in almost the same direction. Specifically, the sensors 7a and 7b are set so as to have the maximum sensitivity in the rotational direction of the actuator 3 when the actuator 3 is present at a neutral position, that is, when the actuator 3 is present at a track between the outmost track and the innermost track.

Figure 15:
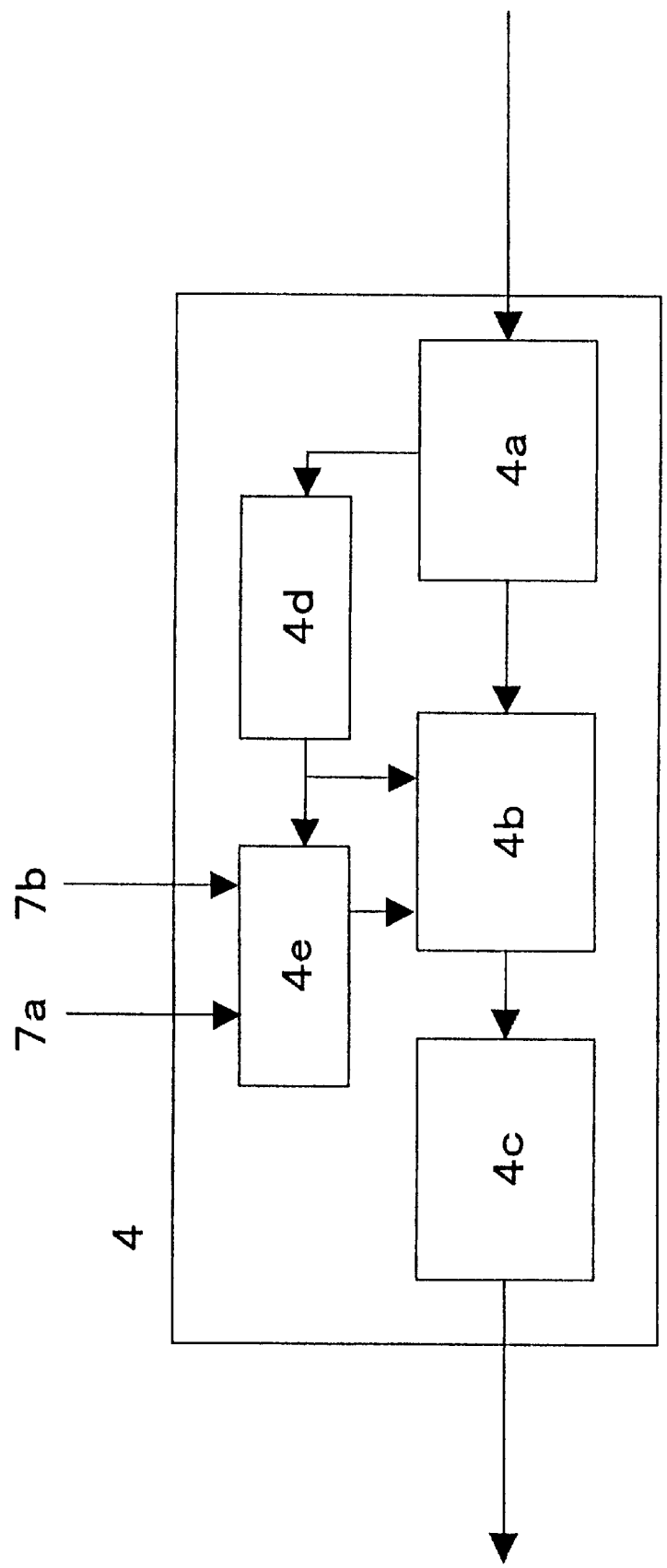
FIG. 15 shows an illustration for explaining the configuration of a controller of the sixth embodiment.

FIG. 15 shows a schematic block diagram of the controller 4. In FIG. 15, symbols 4a, 4c, and 4d are the same as those used for the embodiment 4. Symbol 4e denotes an acceleration-signal converting section for converting the signal of the acceleration sensor 7a or 7b from an analog to digital value, which performs conversion at the timing of the clock signal of the frequency dividing section 4d. Moreover, the converted value is outputted to the controlled-variable computing section 4b.

The operation algorithm of the controlled-variable computing section 4b will be described below. This embodiment also uses the actuator 3 showing the frequency-response characteristic shown in FIG. 6 the same as the fourth embodiment does. The frequency dividing section 4d generates a timing clock at a servo-signal detection cycle, that is, a time interval ½ a sampling cycle similarly to the case of the fourth embodiment and the controlled-variable computing section 4b operates at the time interval (0.092 ms in the case of this embodiment). Therefore, as the vibration mode of the actuator, the original vibration mode (3.9 kHz) and its alias vibration mode (1.5 kHz) are considered. In case of this embodiment, a vibration mode observer for estimating only a vibration mode at the clock timing of the frequency dividing section 4d and a rigid-body mode observer for estimating a rigid-body mode at the servo-signal detection timing are configured in order to accurately estimate an actuator state variable including these vibration modes.

First, an actuator vibration mode model is shown by the following (Equation 23) and an actuator rigid-mode model is shown by the following (Equation 24).

$$x_{dn} = (q_a \ \dot{q}_a \ q_1 \ \dot{q}_1)^t \quad \text{(Equation 23)}$$

$$\dot{x}_{dn} = A_{dn} x_{dn} + b_{dn} u$$

$$y_d = \ddot{\theta} = k_d(\alpha_a - \cos\theta \cdot \alpha_b) = c_{dn} x_{dn}$$

$$A_{dn} = \begin{pmatrix} 0 & 1 & 0 & 0 \\ -\omega_{1a}^2 & -2\zeta_{1a}\omega_{1a} & 0 & 0 \\ 0 & 0 & 0 & 1 \\ 0 & 0 & -\omega_1^2 & -2\zeta_1\omega_1 \end{pmatrix}$$

$$b_{dn} = \begin{pmatrix} 0 \\ \omega_{1a}^2 \\ 0 \\ \omega_1^2 \end{pmatrix}$$

$$c_{dn} = (kvb_{a1} \ kvb_{a2} \ kvb_{11} \ kvb_{12})$$

$$X_r = (y \ \dot{\theta})^t$$

$$\dot{X}_r = A_r X_r + b_r y_d$$

$$y = c_r X_r$$

$$A_r = \begin{pmatrix} 0 & ky \\ 0 & 0 \end{pmatrix}$$

$$b_r = \begin{pmatrix} 0 \\ 1 \end{pmatrix}$$

$$c_r = (1 \ 0) \quad \text{(Equation 24)}$$

Symbol xdn denotes the state variable of a vibration mode and xr denotes that of a rigid-body mode. Moreover, symbol yd denotes an angular acceleration generated due to the operation of an actuator. The acceleration sensor 7a set onto the actuator 3 detects not only the acceleration generated due to the operation of the actuator 3 but also the acceleration generated due to the movement of the entire disk drive. Moreover, the acceleration sensor 7b set to the base 8 detects only the acceleration generated due to the movement of the entire disk drive.

When previously fitting the detecting direction of the acceleration sensor 7a to that of the acceleration sensor 7b, it is possible to obtain only the acceleration generated due to the operation of the actuator 3 by producing the difference between the detecting directions. In this case, the detecting directions of the acceleration sensors 7a and 7b are not fitted to each other due to the actuator 3. However, the position of the magnetic head 2 in the radius direction of the disk 1 is obtained from the track number included in a servo signal detected by the magnetic head 2. Therefore, the rotational angle of the actuator 3 from the base 8 is obtained and thereby, the shift of an acceleration sensor in the detecting direction is obtained. The shift is the rotation angle θ of the actuator 3.

In case of this embodiment, the acceleration sensors 7a and 7b are set so that their detecting directions are fitted to each other when the rotation angle θ of the actuator 3 is equal to 0. Moreover, symbol kd denotes a conversion coefficient for converting a translational acceleration obtained from the acceleration sensor 7a or 7b through operation into an angular acceleration. Other symbols are the same as the case of the embodiment 4.

Then, the vibration mode observer is configured as shown by the following (Equation 26) in accordance with the following (Equation 25) serving as a state equation for the original vibration mode of an actuator digitized with a cycle Ts/2.

$$X_{dn}[j+1] = A_{dnd} X_{dn}[j] + b_{dnd} u[j]$$

$$y_d[j] = c_{dn} X_{dn}[j]$$

$$A_{dnd} = \exp[A_{dn} Ts/2]$$

$$b_{dnd} = \int_0^{Ts/2} \exp[A_{dn}\tau] d\tau \cdot b_{dn} \quad \text{(Equation 25)}$$

$$\hat{X}_{dn}[j+1] = A_{dnd} \hat{X}_{dn}[j] + b_{dnd} u[j] + k(y_d[j] - \hat{y}_d[j])$$

$$\hat{y}_d[j] = c_{dn} \hat{X}_{dn}[j] \quad \text{(Equation 26)}$$

Moreover, the rigid-body mode observer is configured as shown by the following (Equation 28) in accordance with the following (Equation 27) serving as a state equation for the rigid-body mode of an actuator digitized with a cycle Ts.

$$X_r[i+1] = A_{rd} X_r[i] + b_{rd} y_d[i]$$

$$y[i] = c_r X_r[i]$$

$$A_{rd} = \exp[A_r Ts]$$

$$b_{rd} = \int_0^{Ts} \exp[A_r \tau] d\tau \cdot b_r$$

$$c_r = (1 \ 0) \quad \text{(Equation 27)}$$

$$\hat{X}_r[i+1] = A_{rd} \hat{X}_r[i] + b_{rd} y_d[i] + k(y[i] - \hat{y}[i])$$

$$\hat{y}[i] = c_r \hat{X}_r[i] \quad \text{(Equation 28)}$$

According to the above configuration, it is possible to accurately estimate a vibration mode every moment in accordance with the signal of an acceleration sensor even while servo signals are not detected and resultantly, expand a control bandwidth and realize a preferable control characteristic.

A state-feedback controlled variable is computed by using these state variables in accordance with the following (Equation 29) and outputted.

$$u[j] = f_{dy} \cdot (r[i] - \hat{y}[i]) - f\dot{\theta} \cdot \dot{\theta}[i] - f_{rd} \cdot \hat{X}_{dn}[j]$$

$$f_d(f_{dy}, f\theta f_{dr}) \quad \text{(Equation 29)}$$

In the above (Equation 29), symbols i and j respectively show a sampling time described in the embodiment 2. It is shown that the value of a variable shown by the time i is updated every time Ts and a variable shown by the time j is up dated every time Ts/2. Moreover, symbol fd denotes a state feedback gain.

By using the above configuration, the vibration mode of the actuator 3 including a high-frequency signal component is quickly and accurately estimated with a vibration mode observer operating at a high speed and the rigid-body mode comprising a relatively-low-frequency signal component is estimated with a rigid-body mode observer operating at the normal sampling frequency. Therefore, it is possible to accurately estimate the state variable of the actuator 3. Thereby, an advantage is obtained that the transient response characteristic and positioning accuracy are improved.

Moreover, as described for the embodiment 4, a frequency division ratio is not restricted to 2. It is possible to determine the ratio by considering a necessary performance and the capacity of a usable hardware resource.

INDUSTRIAL APPLICABILITY

As described above, the present invention makes it possible to expand a control bandwidth up to ⅕ or more the resonance frequency of the vibration mode of an actuator and resultantly, improve the positioning accuracy of a magnetic head and decrease a track interval. Therefore, an advantage is obtained that the capacity of a magnetic disk unit can be increased. Moreover, by applying the present invention to other information recording/reproducing apparatus for recording or reproducing information by returning the servo information of a head and thereby positioning the head, an advantage is also obtained that the capacity of the information recording/reproducing apparatus can be increased.

What is claimed is:

1. An information recording/reproducing apparatus comprising:
    a head for recording or reproducing information while moving relatively to an information recording/reproducing medium;
    an actuator for supporting the head and movable in accordance with a command; and
    a control section for supplying a command to the actuator in accordance with a signal reproduced by the head to control the movement of the actuator, characterized in that
    the actuator has at least one vibration mode in addition to a movement mode as a rigid body, and
    the control section includes a state estimating section for estimating quantities of states of (1) a vibration mode of the actuator and (2) a rigid-body mode of the actuator in accordance with a signal reproduced by the head and a controlled variable corresponding to a movement command to the actuator, by using an internal model of the actuator including at least one vibration mode of the actuator and
    a controlled-variable generating section for generating the controlled variable in accordance with each estimated quantity of state estimated by the state estimating section;
    wherein the control section is provided with an analog-digital converting section for detecting a servo signal out of signals reproduced by the head and converting the servo signal into a digital signal and a digital-analog converting section for converting a controlled variable into an analog signal at the conversion frequency fs of the analog-digital converting section, and the state estimating section and the controlled-variable generating section performs digital operations every cycle Ts (=1/fs) of the frequency fs.

2. The information recording/reproducing apparatus according to claim 1, characterized in that the frequency of a vibration mode included in the internal model of the state estimating section is ½ the conversion frequency fs of an analog-digital converting section or lower.

3. The information recording/reproducing apparatus according to claim 1 or 2, characterized in that as for the vibration mode included in the internal model of the state estimating section, the frequency characteristic of a transfer function shows a phase-delay characteristic nearby a natural vibration frequency.

4. The information recording/reproducing apparatus according to claim 1, characterized in that the state estimating section has at least one alias vibration mode having a frequency in which a vibration mode having a natural frequency higher than a Nyquist frequency (fs/2) serving as the frequency of a conversion frequency fs of the analog-digital converting section among vibration modes of the actuator is folded at the Nyquist frequency as an internal model.

5. The information recording/reproducing apparatus according to claim 4, wherein the frequency of the alias vibration mode included in the internal model of the state estimating section is ½ the conversion frequency fs of the analog-digital converting section or lower.

6. The information recording/reproducing apparatus according to claim 4 or 5, characterized in that as for the alias vibration mode included in the internal model of the state estimating section, the frequency characteristic of a transfer function shows a phase-delay characteristic nearby a natural vibration frequency.

7. An information recording/reproducing apparatus comprising:
    a head for recording or reproducing information while moving relatively to an information recording/reproducing medium;
    an actuator for supporting the head and movable in accordance with a command; and
    a control section for supplying a command to the actuator in accordance with a signal reproduced by the head to control the movement of the actuator, characterized in that
    the actuator has at least one vibration mode in addition to a movement mode as a rigid body, and
    the control section includes a state estimating section for estimating quantities of states of (1) a vibration mode of the actuator and (2) a rigid-body mode of the actuator in accordance with a signal reproduced by the head and a controlled variable corresponding to a movement command to the actuator, by using an internal model of the actuator including at least one vibration mode of the actuator and
    a controlled-variable generating section for generating the controlled variable in accordance with each estimated quantity of state estimated by the state estimating section;
    wherein the control section is provided with an analog-digital converting section for detecting a servo signal out of signals reproduced by the head and converting the servo signal into a digital signal and a digital-analog converting section for converting a controlled variable into an analog signal at the conversion frequency fs of the analog-digital converting section; and
    the controlled-variable generating section performs digital operation every cycle Ts (=1/fs) of the frequency fs and performs digital operation every cycle Ts2 (=1/fs2) of a frequency fs2 different from a frequency fs.

8. The information recording/reproducing apparatus according to claim 7, characterized in that the frequency fs2 is higher than the frequency fs.

9. The information recording/reproducing apparatus according to claim 7, characterized in that the frequency of a vibration mode included in the internal model of the state estimating section is ½ the frequency fs2 or lower.

10. The information recording/reproducing apparatus according to claim 7, characterized in that as for the frequency of a vibration mode included in the internal model of the state estimating section, the frequency characteristic of a transfer function shows a phase-delay characteristic nearby a natural vibration frequency.

11. The information recording/reproducing apparatus according to claim 7, characterized in that the relation between the frequency fs2 and the frequency fs is shown as fs2=N×fs (N: integer of 2 or more).

12. The information recording/reproducing apparatus according to claim 7, 8, or 11, characterized in that if a servo signal is detected between the present time t and the time t−Ts2 and converted into a digital signal by the analog-digital converting section when the state estimating section operated at the cycle Ts2 performs digital operation, the section estimates a quantity of state by using the digital signal of the servo signal and a controlled variable serving as an output of the controlled-variable generating section as inputs, and if a servo signal is not detected between the present time t and the time t−Ts2, the state estimating section estimates a quantity of state by using the controlled variable serving as the output of the controlled-variable generating section as an input.

13. The information recording/reproducing apparatus according to claim 7, characterized in that the state estimating section has at least one alias vibration mode having a frequency in which a vibration mode having a natural frequency higher than a second Nyquist frequency (fs2/2) serving as a frequency ½ the frequency fs2 out of vibration modes of the actuator is folded at the second Nyquist frequency as an internal model.

14. The information recording/reproducing apparatus according to claim 13, characterized in that the frequency fs2 is higher than the frequency fs.

15. The information recording/reproducing apparatus according to claim 14, characterized in that the relation between the frequency fs2 and the frequency fs is shown as fs2=N×fs (N: integer of 2 or more).

16. The information recording/reproducing apparatus according to claim 13, 14, or 15, characterized in that when a state estimating section operating at the cycle Ts2 perform digital operation, if a servo signal is detected between the present time t and the time t−Ts2 and converted into a digital signal by an analog-digital converting section, the section estimates a quantity of state by using the digital signal of the servo signal and a controlled variable serving as an output of a controlled-variable generating section as inputs, and if a servo signal is not detected between the present time t and the time t−Ts2, the section estimates a quantity of state by using a controlled variable serving as an output of the controlled-variable generating section as an input.

17. The information recording/reproducing apparatus according to claim 13, characterized in that the frequency of the alias vibration mode included in the internal model of the state estimating section is ½ the frequency fs2 or lower.

18. The information recording/reproducing apparatus according to claim 13, characterized in that as for the frequency of the alias vibration mode included in the internal model of the state estimating section, the frequency characteristic of a transfer function shows a phase-delay characteristic nearby a natural vibration frequency.

19. An information recording/reproducing apparatus comprising:

a head for recording or reproducing information while moving relatively to an information recording/reproducing medium;

an actuator for supporting the head and movable in accordance with a command; and a control section for supplying a command to the actuator in accordance with a signal reproduced by the head to control the movement of the actuator, characterized in that the actuator has at least one vibration mode in addition to a movement mode as a rigid body, and the control section includes a state estimating section for estimating quantities of states of (1) a vibration mode of the actuator and (2) a rigid-body mode of the actuator in accordance with a signal reproduced by the head and a controlled variable corresponding to a movement command to the actuator, by using an internal model of the actuator including at least one vibration mode of the actuator and a controlled-variable generating section for generating the controlled variable in accordance with each estimated quantity of state estimated by the state estimating section;

wherein a vibration sensor for detecting the vibration of the actuator is included and the state estimating section estimates quantities of states of the vibration mode and rigid-body mode of the actuator in accordance with a signal reproduced by the head, a controlled variable corresponding to the movement command to the actuator, and a signal output from the vibration sensor; and the control section has an analog-digital converting section for detecting a servo signal out of signals reproduced by the head and converting the servo signal into a digital signal, a digital-analog converting section for converting a controlled variable into an analog signal at the conversion frequency fs of the analog-digital converting section, and a second analog-digital converting section for converting a signal output from the vibration sensor into a digital signal at a frequency fs2 different from the frequency fs, the state estimating section has a vibration mode estimating section constituted of an internal model including at least one vibration mode instead of the rigid-body mode of the actuator and a rigid-body mode estimating section configured by an internal model including a rigid-body mode instead of a vibration mode, the controlled-variable generating section and the rigid-body mode estimating section perform digital operations every cycle Ts (=1/fs) of the frequency fs, the vibration mode estimating section performs digital operation every cycle Ts2 (=1/fs2) of the frequency fs2 and estimates the quantity of state of the vibration mode of the actuator by using the controlled variable serving as an output of the controlled-variable generating section and the digital signal of the vibration sensor as inputs, the rigid-body mode estimating section estimates the quantity of state of the rigid-body mode of the actuator by using the digital signal of the vibration sensor and the digital signal of the servo signal as inputs, and the controlled-variable generating section generates the controlled variable in accordance with estimated quantities of states of the vibration mode estimating section and rigid-body mode estimating section.

20. The information recording/reproducing apparatus according to claim 19, characterized in that the frequency fs2 is higher than the frequency fs.

21. The information recording/reproducing apparatus according to claim 19, characterized in that the relation between the frequency fs2 and the frequency fs is shown as fs2=N×fs (N: integer of 2 or more).

22. The information recording/reproducing apparatus according to claim 19, 20, or 21, characterized in that the frequency of a vibration mode included in the internal model of the state estimating section is ½ the frequency fs2 or lower.

23. The information recording/reproducing apparatus according to claim 19, characterized in that as for the frequency of a vibration mode included in the internal model of the state estimating section, the frequency characteristic of a transfer function shows a phase-delay characteristic nearby a natural vibration frequency.

24. The information recording/reproducing apparatus according to claim 19, characterized in that the vibration mode sensor is an acceleration sensor.

25. An information recording/reproducing apparatus comprising:
- a head for recording or reproducing information while moving relatively to an information recording/reproducing medium;
- an actuator for supporting the head and movable in accordance with a command; and
- a control section for supplying a command to the actuator in accordance with a signal reproduced by the head to control the movement of the actuator, characterized in that
  - the actuator has at least one vibration mode in addition to a movement mode as a rigid body, and
  - the control section includes a state estimating section for estimating quantities of states of (1) a vibration mode of the actuator and (2) a rigid-body mode of the actuator in accordance with a signal reproduced by the head and a controlled variable corresponding to a movement command to the actuator, by using an internal model of the actuator including at least one vibration mode of the actuator and
  - a controlled-variable generating section for generating the controlled variable in accordance with each estimated quantity of state estimated by the state estimating section;
  - wherein a first vibration sensor for detecting the vibration of the actuator and a second vibration sensor for detecting the vibration of a base set to the actuator are included, and
  - the state estimating section estimates quantities of states of the vibration mode and rigid-body mode of the actuator in accordance with a signal reproduced by the head, a controlled variable corresponding to a movement command to the actuator, and signals output from the first and second vibration sensors; and
  - the control section has an analog-digital converting section for detecting a servo signal out of signals reproduced by the head and converting the servo signal into a digital signal, a digital-analog converting section for converting a controlled variable into an analog signal at the conversion frequency fs of the analog-digital converting section, and a second analog-digital converting section for converting signals output from the first and second vibration sensors into digital signals at a frequency fs2 different from the frequency fs,
  - the state estimating section has a vibration mode estimating section configured by an internal model including at least one vibration mode instead of the rigid-body mode of the actuator and a rigid-body mode estimating section configured by an internal model including a rigid-body mode instead of a vibration mode,
  - the controlled-variable generating section and the rigid-body mode estimating section perform digital operations every cycle Ts (=1/fs) of the frequency fs,
  - the vibration mode estimating section performs digital operation every cycle Ts2 (=1/fs2) of the frequency fs and estimates the quantity of state of the vibration mode of the actuator by using the controlled variable serving as an output of the controlled-variable generating section and digital signals of the first and second vibration sensors as inputs,
  - the rigid-body mode estimating section estimates the quantity of state of the rigid-body mode of the actuator by using the digital signals of the first and second vibration sensors and the digital signal of the servo signal as inputs, and
  - the controlled-variable generating section generates the controlled variable in accordance with estimated quantities of states of the vibration mode estimating section and rigid-body mode estimating section.

26. The information recording/reproducing apparatus according to claim 25, characterized in that the frequency fs2 is higher than the frequency fs.

27. The information recording/reproducing apparatus according to claim 25, characterized in that the relation between the frequency fs2 and the frequency fs is shown as fs2=N×fs (N: integer of 2 or more).

28. The information recording/reproducing apparatus according to claim 25, 26, or 27, characterized in that the frequency of a vibration mode included in the internal model of the state estimating section is ½ the frequency fs2 or lower.

29. The information recording/reproducing apparatus according to claim 25, characterized in that as for the frequency of a vibration mode included in the internal model of the state estimating section, the frequency characteristic of a transfer function shows a phase-delay characteristic nearby a natural vibration frequency.

30. The information recording/reproducing apparatus according to claim 25, characterized in that the vibration mode sensor is an acceleration sensor.

* * * * *